US012629825B2

(12) United States Patent
Hwang et al.

(10) Patent No.: US 12,629,825 B2
(45) Date of Patent: May 19, 2026

(54) METHOD OF DETERMINING VALUE OF PARAMETER FOR CONTROLLING WEARABLE DEVICE AND ELECTRONIC DEVICE PERFORMING THE METHOD

(71) Applicant: SAMSUNG ELECTRONICS CO., LTD., Suwon-si (KR)

(72) Inventors: Jungsik Hwang, Suwon-si (KR);
Kyobum Keum, Suwon-si (KR);
Sungcheol Kim, Suwon-si (KR);
Jeongrae Kim, Suwon-si (KR);
Changsu Youk, Suwon-si (KR);
Seokjae Lee, Suwon-si (KR); Giho Jung, Suwon-si (KR); Sukwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 18/189,469

(22) Filed: Mar. 24, 2023

(65) Prior Publication Data

US 2023/0226687 A1      Jul. 20, 2023

Related U.S. Application Data

(63) Continuation of application No. PCT/KR2022/019550, filed on Dec. 5, 2022.

(30) Foreign Application Priority Data

Dec. 8, 2021    (KR) ........................ 10-2021-0174760
Sep. 8, 2022    (KR) ........................ 10-2022-0114272

(51) Int. Cl.
*B25J 9/16*          (2006.01)
*A63B 24/00*        (2006.01)
(Continued)

(52) U.S. Cl.
CPC ......... *B25J 9/1633* (2013.01); *A63B 24/0062* (2013.01); *B25J 9/0006* (2013.01);
(Continued)

(58) Field of Classification Search
CPC ...... B25J 9/1633; B25J 9/0006; B25J 13/088; A63B 24/0062; A63B 2220/803; A63B 2225/20; A63B 2225/50
See application file for complete search history.

(56) References Cited

U.S. PATENT DOCUMENTS 1,350,146 A * 8/1920 Fremaux .............. A47B 81/067
                                                          312/9.23
4,578,769 A * 3/1986 Frederick .................. G01P 3/50
                                                          234/105
(Continued)

FOREIGN PATENT DOCUMENTS

CN        109789543 B * 9/2022 ............ B25J 9/0006
EP        4321093 A2 * 2/2024 ......... A63B 69/0028
(Continued)

OTHER PUBLICATIONS

"Motion Sensors for Knee Angle Recognition in Muscle Rehabilitation Solutions;" Franco et al., Sensors (Basel, Switzerland), 22(19), 7605; Oct. 7, 2022. (Year: 2022).*
(Continued)

*Primary Examiner* — Khoi H Tran
*Assistant Examiner* — Jorge O Peche
(74) *Attorney, Agent, or Firm* — NIXON & VANDERHYE P.C.

(57)          ABSTRACT

An electronic device may receive log information regarding a motion of a wearable device from the wearable device, determine a value of at least one of one or more mobile parameters to be applied to a robot parameter algorithm for calculating a value of a robot parameter used to control the
(Continued)

wearable device based on the log information, and determine the value of the robot parameter based on the robot parameter algorithm and the determined value of at least one of the mobile parameters.

17 Claims, 18 Drawing Sheets

(51) Int. Cl.
B25J 9/00 (2006.01)
B25J 13/08 (2006.01)

(52) U.S. Cl.
CPC .............. B25J 9/161 (2013.01); B25J 9/163 (2013.01); B25J 9/1671 (2013.01); B25J 13/088 (2013.01); A63B 2220/803 (2013.01); A63B 2220/836 (2013.01); A63B 2225/20 (2013.01); A63B 2225/50 (2013.01)

(56) References Cited

U.S. PATENT DOCUMENTS

| | | | | |
|---|---|---|---|---|
| 5,308,303 A * | 5/1994 | Rawls | .................... | A63B 24/00 |
| | | | | 482/137 |
| 5,387,170 A * | 2/1995 | Rawls | ............... | A63B 24/0062 |
| | | | | 482/137 |
| 5,527,239 A * | 6/1996 | Abbondanza | .......... | A63B 24/00 |
| | | | | 482/3 |
| 5,667,459 A * | 9/1997 | Su | ...................... | A63B 71/0622 |
| | | | | 482/3 |
| 6,458,060 B1 * | 10/2002 | Watterson | .......... | A63B 22/0235 |
| | | | | 482/4 |
| 8,096,965 B2 * | 1/2012 | Goffer | ...................... | A61H 3/00 |
| | | | | 602/26 |
| 8,181,520 B2 * | 5/2012 | Kadota | ............... | A61B 5/6828 |
| | | | | 601/33 |
| 8,972,058 B2 * | 3/2015 | Lee | ........................ | B25J 9/162 |
| | | | | 601/5 |
| 9,409,053 B1 * | 8/2016 | Todd | ...................... | G16H 20/30 |
| 10,201,437 B2 * | 2/2019 | Kim | ...................... | A61H 1/024 |
| 10,543,143 B2 * | 1/2020 | Asano | ...................... | B25J 9/163 |
| 10,632,369 B2 * | 4/2020 | Hardee | ................. | A63F 13/211 |
| 10,657,461 B2 * | 5/2020 | McMahan | .............. | G06F 17/18 |
| 11,148,279 B1 * | 10/2021 | Mooney | ............... | A61H 1/0266 |
| 2001/0007845 A1 * | 7/2001 | Afanasenko | ....... | A63B 21/4009 |
| | | | | 482/121 |
| 2002/0055418 A1 * | 5/2002 | Pyles | ...................... | A63B 24/00 |
| | | | | 482/8 |
| 2003/0092545 A1 * | 5/2003 | Koscielny | .......... | A63B 21/0004 |
| | | | | 482/124 |
| 2003/0223844 A1 * | 12/2003 | Schiele | .................. | A63B 23/12 |
| | | | | 414/5 |
| 2004/0064195 A1 * | 4/2004 | Herr | ......................... | A61F 2/66 |
| | | | | 623/44 |
| 2004/0106881 A1 * | 6/2004 | McBean | ................. | A61B 5/389 |
| | | | | 601/5 |
| 2004/0229730 A1 * | 11/2004 | Ainsworth | ............. | G06Q 10/06 |
| | | | | 482/8 |
| 2005/0107725 A1 * | 5/2005 | Wild | .................... | A61H 9/0007 |
| | | | | 601/149 |
| 2006/0184280 A1 * | 8/2006 | Oddsson | ................... | A61F 2/60 |
| | | | | 623/24 |
| 2008/0096726 A1 * | 4/2008 | Riley | ................. | A63B 24/0087 |
| | | | | 482/8 |
| 2010/0009810 A1 * | 1/2010 | Trzecieski | ............. | G16H 20/30 |
| | | | | 482/8 |
| 2011/0205067 A1 * | 8/2011 | Konishi | ................. | A61H 1/024 |
| | | | | 340/573.1 |
| 2011/0275940 A1 * | 11/2011 | Nims | .................... | A61B 5/222 |
| | | | | 600/483 |
| 2012/0095373 A1 * | 4/2012 | Hirata | ...................... | A61H 3/00 |
| | | | | 601/35 |
| 2013/0059698 A1 * | 3/2013 | Barton | ............... | A63B 71/0622 |
| | | | | 482/63 |
| 2013/0211596 A1 * | 8/2013 | Takagi | ................... | B25J 9/1633 |
| | | | | 700/261 |
| 2013/0218345 A1 * | 8/2013 | Lee | .......................... | B25J 9/162 |
| | | | | 700/261 |
| 2013/0274067 A1 * | 10/2013 | Watterson | ............ | A63B 22/203 |
| | | | | 482/5 |
| 2014/0012164 A1 * | 1/2014 | Tanaka | ................... | B25J 9/0006 |
| | | | | 601/35 |
| 2014/0316575 A1 * | 10/2014 | Takagi | ................... | B25J 9/1633 |
| | | | | 700/261 |
| 2015/0181314 A1 * | 6/2015 | Swanson | ................. | G01C 21/20 |
| | | | | 340/870.07 |
| 2015/0217444 A1 * | 8/2015 | Asada | .................... | B25J 9/0006 |
| | | | | 700/258 |
| 2016/0107309 A1 * | 4/2016 | Walsh | .................. | A61B 5/6831 |
| | | | | 248/550 |
| 2016/0143800 A1 * | 5/2016 | Hyung | ..................... | A61H 3/00 |
| | | | | 623/32 |
| 2016/0144236 A1 * | 5/2016 | Ko | ........................... | G16H 20/30 |
| | | | | 434/247 |
| 2016/0184985 A1 * | 6/2016 | Shim | ...................... | B25J 9/1671 |
| | | | | 623/32 |
| 2016/0269868 A1 * | 9/2016 | Su | ........................... | G16H 40/67 |
| 2017/0027801 A1 * | 2/2017 | Choi | ...................... | A61B 5/024 |
| 2017/0043476 A1 * | 2/2017 | Seo | ...................... | G05B 19/042 |
| 2017/0128235 A1 * | 5/2017 | Seo | ...................... | A61F 5/0102 |
| 2017/0155978 A1 * | 6/2017 | Noh | ...................... | H04Q 9/00 |
| 2017/0332950 A1 * | 11/2017 | Yu | ...................... | G06V 30/242 |
| 2018/0141206 A1 * | 5/2018 | Bereziy | ................. | B25J 9/0006 |
| 2018/0178064 A1 * | 6/2018 | Nah | ...................... | A61B 5/744 |
| 2018/0358119 A1 * | 12/2018 | Bhushan | ............... | G16H 40/63 |
| 2019/0046078 A1 * | 2/2019 | Lim | ...................... | B25J 9/0006 |
| 2019/0105215 A1 * | 4/2019 | Dalley | ..................... | A61H 3/00 |
| 2019/0105777 A1 * | 4/2019 | Dalley | ................... | B25J 9/1615 |
| 2019/0143173 A1 * | 5/2019 | Fung | .................. | A63B 24/0006 |
| | | | | 710/1 |
| 2019/0247697 A1 * | 8/2019 | Park | ................... | A63B 21/4011 |
| 2019/0283247 A1 * | 9/2019 | Chang | ................. | A61B 5/1121 |
| 2019/0358113 A1 * | 11/2019 | Masselin | ................ | B25J 9/0006 |
| 2019/0375106 A1 * | 12/2019 | Lee | .......................... | A61F 2/70 |
| 2020/0008583 A1 * | 1/2020 | Gunura | .................... | A47C 9/10 |
| 2020/0060921 A1 * | 2/2020 | Dalley | .................... | A61H 3/00 |
| 2020/0170809 A1 * | 6/2020 | Etenzi | ...................... | A61F 2/74 |
| 2020/0188215 A1 * | 6/2020 | Park | ...................... | A61H 3/00 |
| 2020/0206898 A1 * | 7/2020 | Xiong | .................. | B25J 13/085 |
| 2020/0237260 A1 * | 7/2020 | Hyung | .................. | A61B 5/112 |
| 2020/0276698 A1 * | 9/2020 | Ding | ...................... | B25J 9/163 |
| 2020/0281801 A1 * | 9/2020 | Karlovich | ............... | A47C 3/20 |
| 2020/0289030 A1 * | 9/2020 | Ikeuchi | .................. | B25J 9/0006 |
| 2020/0346009 A1 * | 11/2020 | Murray | ................. | B25J 9/0006 |
| 2021/0007500 A1 * | 1/2021 | Vafi | ...................... | A61F 5/0125 |
| 2021/0007874 A1 * | 1/2021 | Galiana Bujanda | .... | A61F 5/028 |
| 2021/0085554 A1 * | 3/2021 | Roh | ...................... | G06F 1/3212 |
| 2021/0093919 A1 * | 4/2021 | Lyke | ...................... | G16H 50/20 |
| 2021/0121741 A1 * | 4/2021 | Lee | ................... | A63B 21/0004 |
| 2021/0128972 A1 * | 5/2021 | Lee | ................. | A63B 21/00178 |
| 2021/0162263 A1 * | 6/2021 | Roh | ................... | A63B 24/0087 |
| 2021/0275382 A1 * | 9/2021 | Farris | ................... | A61H 1/0244 |
| 2021/0315764 A1 * | 10/2021 | Decastro | ................. | A61H 3/00 |
| 2021/0338515 A1 * | 11/2021 | Farris | ................... | A61H 1/0244 |
| 2022/0221930 A1 * | 7/2022 | Kim | ...................... | A61B 5/1114 |
| 2022/0347847 A1 * | 11/2022 | Duburcq | ................ | G06N 3/08 |
| 2022/0395729 A1 * | 12/2022 | Toth | ...................... | G16H 40/63 |
| 2023/0031376 A1 * | 2/2023 | Lim | ...................... | A61B 5/00 |
| 2023/0053879 A1 * | 2/2023 | Perez | .................. | B25J 13/088 |
| 2023/0058389 A1 * | 2/2023 | Kaveny | ............... | A61B 5/4528 |
| 2023/0082953 A1 * | 3/2023 | Berger | .................. | G06V 20/44 |
| 2023/0201009 A1 * | 6/2023 | Hwang | ............. | A63B 21/0059 |
| 2023/0201668 A1 * | 6/2023 | Lee | ................. | A63B 21/00181 |
| | | | | 482/4 |
| 2023/0226687 A1 * | 7/2023 | Hwang | .................. | B25J 9/163 |
| | | | | 700/261 |
| 2023/0241778 A1 * | 8/2023 | Walsh | .................... | B25J 9/142 |
| | | | | 700/254 |
| 2023/0285219 A1 * | 9/2023 | Kim | .......................... | B25J 9/00 |
| 2023/0329588 A1 * | 10/2023 | Kim | ........................ | G16H 20/30 |

(56) References Cited

U.S. PATENT DOCUMENTS

| | | | | |
|---|---|---|---|---|
| 2023/0381591 | A1* | 11/2023 | Kim | A61B 5/11 |
| 2024/0000648 | A1* | 1/2024 | Risbourg | A61H 1/0262 |
| 2024/0009519 | A1* | 1/2024 | Kim | A63B 71/06 |
| 2024/0033578 | A1* | 2/2024 | Kim | A63B 21/4025 |
| 2024/0148594 | A1* | 5/2024 | Kim | A61H 1/02 |
| 2024/0173194 | A1* | 5/2024 | Lee | A63B 23/0405 |
| 2024/0198170 | A1* | 6/2024 | Bae | A61H 3/00 |
| 2024/0232463 | A9* | 7/2024 | Kim | G06F 30/17 |
| 2024/0277550 | A1* | 8/2024 | Kim | B25J 9/00 |
| 2024/0350036 | A1* | 10/2024 | Seo | A61B 5/742 |
| 2024/0359057 | A1* | 10/2024 | McInturf | A63B 21/0552 |
| 2024/0359059 | A1* | 10/2024 | Cohen | A63B 21/0058 |
| 2024/0390213 | A1* | 11/2024 | Seo | A63B 21/4047 |
| 2024/0399187 | A1* | 12/2024 | Seo | B25J 9/0006 |
| 2024/0416176 | A1* | 12/2024 | Jung | A63B 21/4021 |
| 2025/0001259 | A1* | 1/2025 | Lee | A63B 71/0622 |
| 2025/0009261 | A1* | 1/2025 | Ju | A61B 5/1116 |
| 2025/0009588 | A1* | 1/2025 | Ahn | A63B 21/00178 |
| 2025/0010118 | A1* | 1/2025 | Kang | A63B 24/0006 |
| 2025/0032002 | A1* | 1/2025 | Jung | A61B 5/112 |
| 2025/0032853 | A1* | 1/2025 | Kim | A63B 24/0062 |
| 2025/0099812 | A1* | 3/2025 | Whalen | A63B 24/0062 |
| 2025/0134746 | A1* | 5/2025 | Kim | G01S 17/88 |

FOREIGN PATENT DOCUMENTS

| | | | | | |
|---|---|---|---|---|---|
| EP | 4520308 | A1 * | 3/2025 | | A63B 21/00178 |
| JP | 2017154210 | A | 9/2017 | | |
| KR | 20170070414 | A * | 6/2017 | | B25J 13/085 |
| KR | 20180136656 | A | 12/2018 | | |
| KR | 20190032925 | A | 3/2019 | | |
| KR | 20210035958 | A | 4/2021 | | |
| KR | 102250265 | B1 * | 5/2021 | | A61H 1/0262 |
| KR | 20230121681 | A * | 8/2023 | | A61H 1/0262 |

OTHER PUBLICATIONS

"A Survey of Wearable Devices and Challenges;" Seneviratne et al., IEEE Communications Surveys & Tutorials (vol. 19, Issue: 4, 2017, pp. 2573-2620); Oct. 1, 2017. (Year: 2017).*

Wearable and IoT Technologies Application for Physical Rehabilitation; Alexandre et al., 2018 International Symposium in Sensing and Instrumentation in IoT Era (ISSI) (2018, pp. 1-6); Sep. 1, 2018. (Year: 2018).*

Extended European Search Report dated Oct. 9, 2024 for EP Application No. 22904583.6.

* cited by examiner

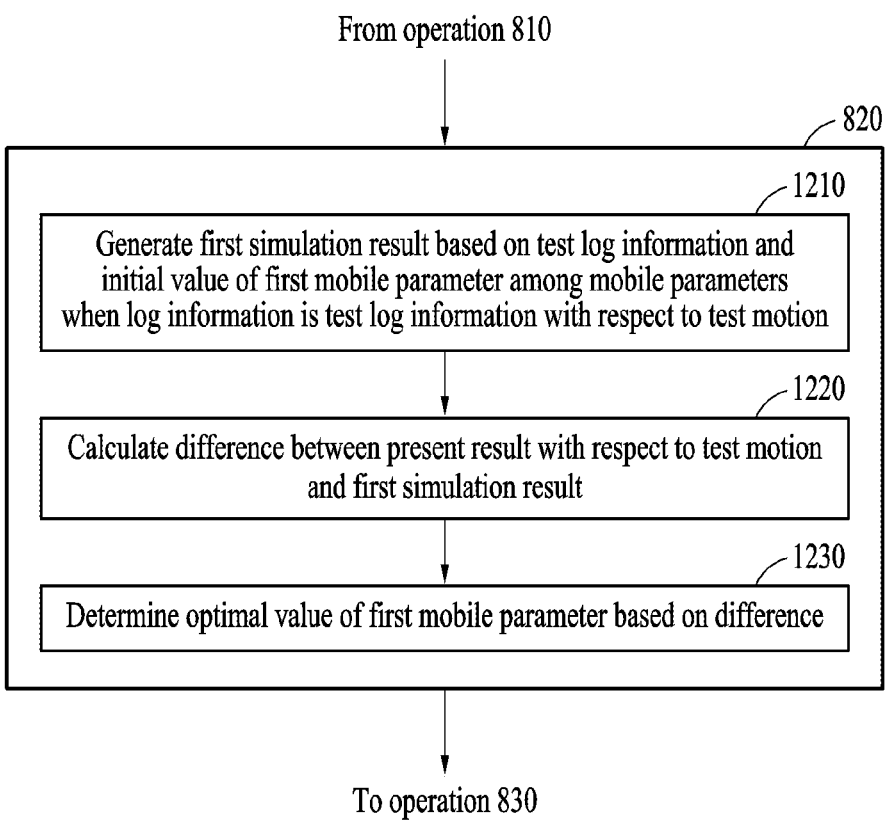

From operation 810

820

1210

Generate first simulation result based on test log information and initial value of first mobile parameter among mobile parameters when log information is test log information with respect to test motion

1220

Calculate difference between present result with respect to test motion and first simulation result

1230

Determine optimal value of first mobile parameter based on difference

To operation 830

FIG. 12

METHOD OF DETERMINING VALUE OF PARAMETER FOR CONTROLLING WEARABLE DEVICE AND ELECTRONIC DEVICE PERFORMING THE METHOD

CROSS-REFERENCE TO RELATED APPLICATIONS

This application is a continuation application of International Application No. PCT/KR2022/019550 designating the United States, filed on Dec. 5, 2022, in the Korean Intellectual Property Receiving Office and claiming priority to Korean Patent Application No. 10-2021-0174760, filed on Dec. 8, 2021, and Korean Patent Application No. 10-2022-0114272, filed on Sep. 8, 2022, in the Korean Intellectual Property Office, the disclosures of which are all hereby incorporated by reference herein in their entireties.

BACKGROUND

1. Field

Certain example embodiments relate to a technology for determining a value of a parameter for controlling a wearable device worn by a user.

2. Description of Related Art

A change into aging societies has contributed to a growing number of people who experience inconvenience and pain from reduced muscular strength or joint problems due to aging. Thus, there is a growing interest in walking assist devices that enable elderly users and/or patients with reduced muscular strength or joint problems to walk with less effort for example.

SUMMARY

According to an example embodiment, an electronic device may include a communication module, comprising communication circuitry, configured to exchange data with an external device, and at least one processor configured to control the electronic device, wherein the at least one processor may be configured to perform receiving, from a wearable device connected, directly or indirectly, to the electronic device, log information regarding a motion of the wearable device, determining a value of at least one of one or more mobile parameters to be applied to a robot parameter algorithm for calculating a value of a robot parameter used to control the wearable device based on the log information, determining the value of the robot parameter based on the robot parameter algorithm and the determined value of at least one of the mobile parameters, and transmitting the determined value of the robot parameter to the wearable device.

According to an example embodiment, a method performed by an electronic device may include receiving, from a wearable device connected, directly or indirectly, to the electronic device, log information with respect to a motion of the wearable device, determining a value of at least one of one or more mobile parameters to be applied to a robot parameter algorithm for calculating a value of a robot parameter used to control the wearable device based on the log information, determining the value of the robot parameter based on the robot parameter algorithm and the determined value of at least one of the mobile parameters, and transmitting the determined value of the robot parameter to the wearable device.

According to an example embodiment, a server may include a communication module, comprising communication circuitry, configured to exchange data with an external device, and at least one processor configured to control the server, wherein the processor may be configured to perform receiving log information with respect to a motion of a wearable device through a user terminal connected to the wearable device, determining a value of at least one of one or more mobile parameters to be applied to a robot parameter algorithm for calculating a value of a robot parameter used to control the wearable device based on the log information, determining the value of the robot parameter based on the robot parameter algorithm and the determined value of at least one of the mobile parameters, and transmitting the determined value of the robot parameter to the wearable device through the user terminal.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 12 is a flowchart illustrating a method of determining an optimal value of a mobile parameter based on a test motion of a wearable device according to an example;

DETAILED DESCRIPTION

Hereinafter, various example embodiments of the present disclosure will be described with reference to the accompanying drawings. However, this is not intended to limit the present disclosure to specific embodiments, and it should be understood that various modifications, equivalents, and/or alternatives of the embodiments of the present disclosure are included.

Figure 1:
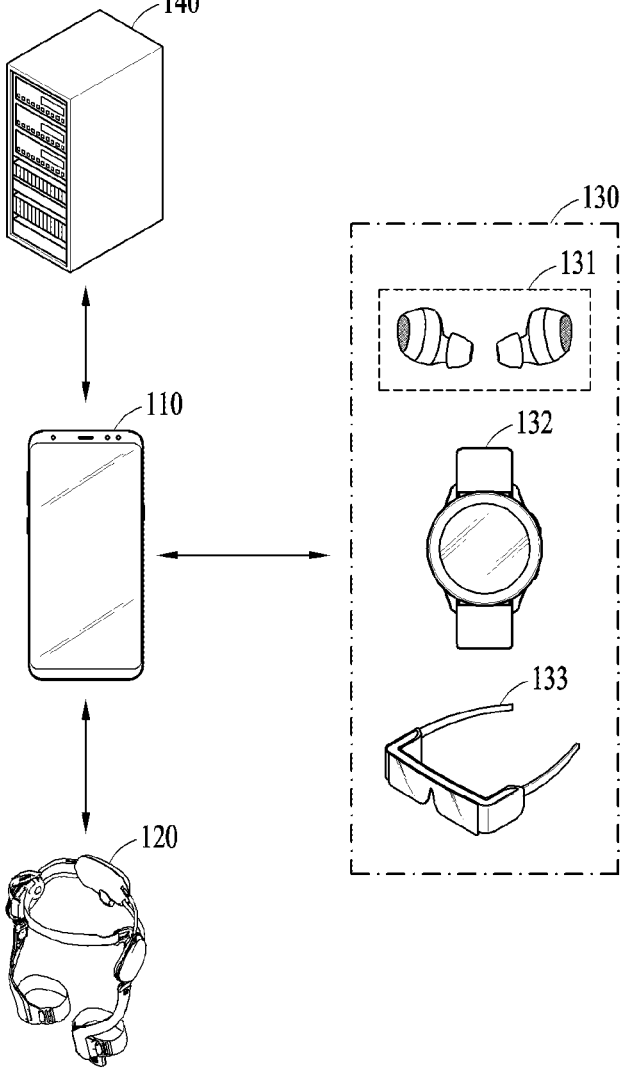
FIG. 1 is a diagram illustrating a configuration of a system for providing a user with a workout program according to an example embodiment.

FIG. 1 is a diagram illustrating a configuration of a system for providing a user with a workout program according to an example embodiment.

According to an example embodiment, a system 100 for providing a user with a workout program may include an electronic device 110, a wearable device 120, an additional device 130, and a server 140.

According to an example embodiment, the electronic device 110 may be a user terminal that may be connected to the wearable device 120 using short-range wireless communication. For example, the electronic device 110 may transmit a control signal for controlling the wearable device 120 to the wearable device 120. The electronic device 110 will be described in detail below with reference to FIG. 2, and the transmission of a control signal will be described in detail below with reference to FIG. 4.

According to an example embodiment, the wearable device 120 may provide a user wearing the wearable device 120 with an assistance force for assisting a gait or a resistance force for impeding a gait. The resistance force may be provided to the user to assist the user in doing a workout. The values of various control parameters (or robot parameters) used in the wearable device 120 may be controlled to control the assistance force or the resistance force output by the wearable device 120. The structure and driving method of the wearable device 120 will be described in detail below with reference to FIGS. 3A, 3B, 3C, 3D, 4, 5, and 6.

According to an example embodiment, the electronic device 110 may be connected to the additional device 130 (e.g., wireless earphones 131, a smart watch 132, or smart glasses 133) using short-range wireless communication. For example, the electronic device 110 may output information indicating the state of the electronic device 110 or the state of the wearable device 120 to the user through the additional device 130. For example, feedback information with respect to a walking state of the user wearing the wearable device 120 may be output through a haptic device, a speaker device, and a display device of the additional device 130.

According to an example embodiment, the electronic device 110 may be connected to the server 140 using short-range wireless communication or cellular communication. For example, the server 140 may include a database in which information about a plurality of workout programs to be provided to a user through the wearable device 120 is stored. For example, the server 140 may manage a user account of the user of the electronic device 110 or the wearable device 120. The server 140 may store and manage a workout program performed by the user and a result of performance with respect to the workout program in link with the user account. An example of the configuration of the server 140 will be described in detail below with reference to FIG. 7.

According to an example embodiment, the system 100 may determine values of mobile parameters for the user based on at least one of user information, a user feature, or an athletic ability summary of the user of the wearable device 120. The values of the mobile parameters determined for the user may be personalized values. A value of a robot parameter that controls a motion of the wearable device 120 may be output by applying a value of a mobile parameter to a robot parameter algorithm. The value of the robot parameter output based on the value of the personalized mobile parameter may also be a personalized value. A method of personalizing the value of the mobile parameter for the user of the wearable device 120 will be described in detail below with reference to FIGS. 8 to 16.

Figure 2:
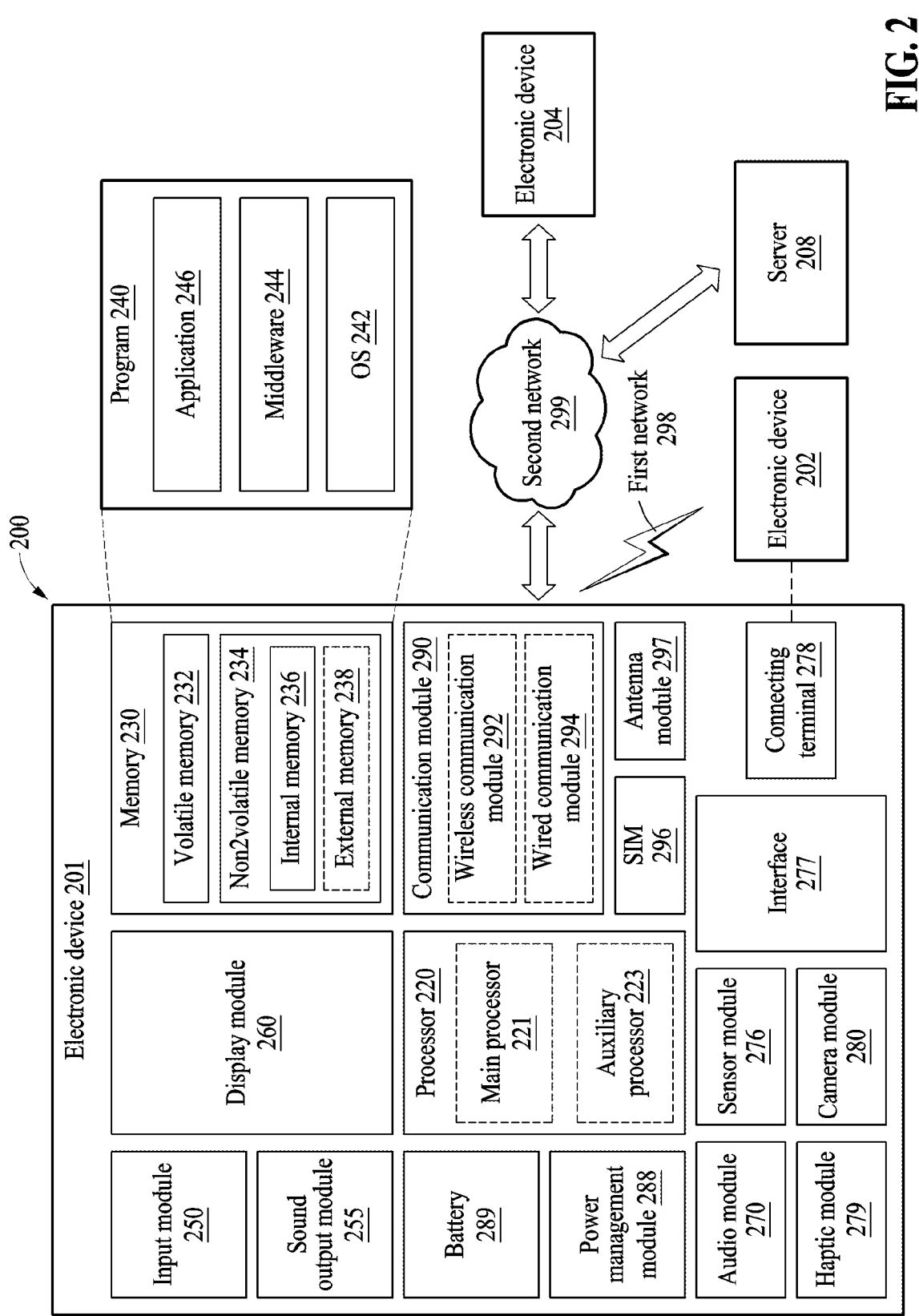
FIG. 2 is a block diagram of an electronic device in a network environment according to an example embodiment.

FIG. 2 is a block diagram of an electronic device in a network environment according to an example embodiment.

FIG. 2 is a block diagram of an electronic device 201 (e.g., the electronic device 110 of FIG. 1) in a network environment 200 according to an example embodiment. Referring to FIG. 2, the electronic device 201 in the network environment 200 may communicate with an electronic device 202 via a first network 298 (e.g., a short-range wireless communication network), or communicate with at least one of an electronic device 204 or a server 208 via a second network 299 (e.g., a long-range wireless communication network). According to an example embodiment, the electronic device 201 may communicate with the electronic device 204 via the server 208. According to an example embodiment, the electronic device 201 may include a processor 220, a memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In some embodiments, at least one (e.g., the connecting terminal 278) of the above components may be omitted from the electronic device 201, or one or more other components may be added in the electronic device 201. In some embodiments, some (e.g., the sensor module 276, the camera module 280, or the antenna module 297) of the components may be integrated as a single component (e.g., the display module 260).

The processor 220 may execute, for example, software (e.g., a program 240) to control at least one other component (e.g., a hardware or software component) of the electronic device 201 connected to the processor 220, and may perform various data processing or computation. According to an example embodiment, as at least a portion of data processing or computation, the processor 220 may store a command or data received from another component (e.g., the sensor module 276 or the communication module 290) in a volatile memory 232, process the command or the data stored in the volatile memory 232, and store resulting data in a non-volatile memory 234. According to an example embodiment, the processor 220 may include a main processor 221 (e.g., a central processing unit (CPU) or an application processor (AP)) or an auxiliary processor 223 (e.g., a graphics processing unit (GPU), a neural processing unit (NPU), an image signal processor (ISP), a sensor hub processor, or a communication processor (CP)) that is operable independently of, or in conjunction with the main processor 221. For example, when the electronic device 201 includes the main processor 221 and the auxiliary processor 223, the auxiliary processor 223 may be adapted to consume less power than the main processor 221 or to be specific to a specified function. The auxiliary processor 223 may be implemented separately from the main processor 221 or as a portion of the main processor 221.

The auxiliary processor 223 may control at least some of functions or states related to at least one (e.g., the display module 260, the sensor module 276, or the communication module 290) of the components of the electronic device 201, instead of the main processor 221 while the main processor 221 is in an inactive (e.g., sleep) state or along with the main processor 221 while the main processor 221 is in an active state (e.g., executing an application). According to an example embodiment, the auxiliary processor 223 (e.g., an ISP or a CP) may be implemented as a portion of another component (e.g., the camera module 280 or the communication module 290) that is functionally related to the auxiliary processor 223. According to an example embodiment, the auxiliary processor 223 (e.g., an NPU) may include a hardware structure specified for artificial intelligence (AI) model processing. An artificial intelligence model may be generated by machine learning. Such learning may be performed by, for example, the electronic device 201 in which an artificial intelligence model is executed, or performed via a separate server (e.g., the server 208). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored as software in the memory 230, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output a sound signal to the outside of the electronic device 201. The sound output module 255 may include, for example, a speaker or a receiver. The speaker may be used for general purposes, such as playing multimedia or playing record. The receiver may be used to receive an incoming call. According to an example embodiment, the receiver may be implemented separately from the speaker or as a portion of the speaker.

The display module 260 may visually provide information to the outside (e.g., a user) of the electronic device 201. The display module 260 may include, for example, a control circuit for controlling a display, a hologram device, or a projector and control circuitry to control a corresponding one of the display, the hologram device, and the projector. According to an example embodiment, the display module 260 may include a touch sensor adapted to sense a touch, or a pressure sensor adapted to measure an intensity of a force incurred by the touch. The display module 260 may be a user interface.

The audio module 270 may convert a sound into an electrical signal or vice versa. According to an example embodiment, the audio module 270 may obtain the sound via the input module 250 or output the sound via the sound output module 255 or an external electronic device (e.g., an electronic device 202 such as a speaker or a headphone) directly or wirelessly connected to the electronic device 201.

The sensor module 276 may detect an operational state (e.g., power or temperature) of the electronic device 201 or an environmental state (e.g., a state of a user) external to the electronic device 201, and generate an electrical signal or data value corresponding to the detected state. According to an example embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an example embodiment, the interface 277 may include, for example, a high-definition multimedia interface (HDMI), a universal serial bus (USB) interface, a secure digital (SD) card interface, or an audio interface.

The connecting terminal 278 may include a connector via which the electronic device 201 may be physically connected to an external electronic device (e.g., the electronic device 202). According to an example embodiment, the connecting terminal 278 may include, for example, an HDMI connector, a USB connector, an SD card connector, or an audio connector (e.g., a headphone connector).

The haptic module 279 may convert an electrical signal into a mechanical stimulus (e.g., a vibration or a movement) or an electrical stimulus which may be recognized by a user via his or her tactile sensation or kinesthetic sensation. According to an example embodiment, the haptic module 279 may include, for example, a motor, a piezoelectric element, or an electric stimulator.

The camera module 280 may take a still image and a video. According to an example embodiment, the camera module 280 may include one or more lenses, image sensors, ISPs, or flashes.

The power management module 288 may manage power supplied to the electronic device 201. According to an example embodiment, the power management module 288 may be implemented as, for example, at least a portion of a power management integrated circuit (PMIC).

The battery 289 may supply power to at least one component of the electronic device 201. According to an example embodiment, the battery 289 may include, for example, a primary cell which is not rechargeable, a secondary cell which is rechargeable, or a fuel cell.

The communication module 290, comprising communication circuitry, may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that operate independently of the processor 220 (e.g., an application processor) and support direct (e.g., wired) communication or wireless communication. According to an example embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module, or a power line communication (PLC) module). A corresponding one of these communication modules may communicate with the external electronic device 204 via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the SIM 296.

The wireless communication module 292, comprising communication circuitry, may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., a mmWave band) to achieve, e.g., a high data transmission rate. The wireless communication module 292 may support various technologies for securing performance on a high-frequency band, such as, e.g., beam-forming, massive multiple-input and multiple-output (MIMO), full dimensional MIMO (FD-MIMO), an array antenna, analog beam-forming, or a large scale antenna. The wireless communication module 292 may support various requirements specified in the electronic device 201, an external electronic device (e.g., the electronic device 204), or a network system (e.g., the second network 299). According to an example embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an example embodiment, the antenna module 297 may include an antenna including a radiating element including a conductive material or a conductive pattern formed in or on a substrate (e.g., a printed circuit board (PCB)). According to an example embodiment, the antenna module 297 may include a plurality of antennas (e.g., array antennas). In such a case, at least one antenna appropriate for a communication scheme used in a communication network, such as the first network 298 or the second network 299, may be selected by, for example, the communication module 290 from the plurality of antennas. The signal or the power may be transmitted or received between the communication module 290 and the external electronic device via the at least one selected antenna. According to an example embodiment, another component (e.g., a radio frequency integrated circuit (RFIC)) other than the radiating element may be additionally formed as a portion of the antenna module 297 comprising at least one antenna.

According to an example embodiment, the antenna module 297 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 201 and the external electronic device 204 via the server 208 coupled with the second network 299. Each of the external electronic devices 202 and 204 may be a device of the same type as or a different type from the electronic device 201. According to an example embodiment, all or some of operations to be executed by the electronic device 201 may be executed at one or more of the external electronic devices 202, 204, and 208. For example, if the electronic device 201 needs to perform a function or a service automatically, or in response to a request from a user or another device, the electronic device 201, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 201. The electronic device 201 may provide the outcome, with or without further processing of the outcome, as at least portion of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In an example embodiment, the external electronic device 204 may include an Internet-of-things (IoT) device. The server 208 may be an intelligent server using machine learning and/or a neural network. According to an example embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

The electronic device according to an example embodiment may be one of various types of electronic devices. The electronic device may include, for example, a portable communication device (e.g., a smart phone), a computer device, a portable multimedia device, a portable medical device, a camera, a wearable device, or a home appliance device. According to an example embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC). Thus, each "module" herein may comprise circuitry.

Various embodiments as set forth herein may be implemented as software (e.g., the program 240) including one or more instructions that are stored in a storage medium (e.g., which may include an internal memory 236 and/or an external memory 238) that is readable by a machine (e.g., the electronic device 201). For example, a processor (e.g., the processor 220) of the machine (e.g., the electronic device 201) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIGS. 3A, 3B, 3C, and 3D are diagrams illustrating a wearable device according to an example embodiment.

Referring to FIGS. 3A, 3B, 3C, and 3D, a wearable device 300 (e.g., the wearable device 120 of FIG. 1) may be worn by a user to assist a gait (e.g., walking) of the user. For example, the wearable device 300 may be a device for assisting a gait (e.g., walking) of a user. Further, the wearable device 300 may be a workout device that provides a workout function by assisting a gait of the user and providing the user with a resistance force. For example, the resistance force provided to the user may be a force actively applied to the user, such as a force output by a device such as a motor. Alternatively, the resistance force may not be a force actively applied to the user, but may be a force that impedes a motion of the user, such as a frictional force. The resistance force may also be referred to as a workout load.

Although FIGS. 3A, 3B, 3C, and 3D illustrate a hip-type wearable device 300, the type of the wearable device is not limited thereto. The wearable device may be a type that supports the entire lower limbs or a type that supports a portion of the lower limbs. In addition, the wearable device may be one of a type that supports a portion of the lower limbs, a type that supports up to the knees, a type that supports up to the ankles, and a type that supports the entire body.

The embodiments described with reference to FIGS. 3A, 3B, 3C, and 3D may apply to a hip-type wearable device, but are not limited thereto, and may all apply to various types of wearable devices.

According to one aspect, the wearable device 300 may include a driver 310, a sensor unit 320 comprising at least one sensor, an inertial measurement unit (IMU) 330 comprising at least one sensor, a controller 340 comprising circuitry, a battery 350, and a communication module 352 comprising communication circuitry. For example, the IMU 330 and the controller 340 may be disposed in a main frame of the wearable device 300. Alternatively, the IMU 330 and the controller 340 (comprising processing circuitry) may be included in a housing (not shown) that is formed in (or attached to) the outside of the main frame of the wearable device 300.

Figure 3A:
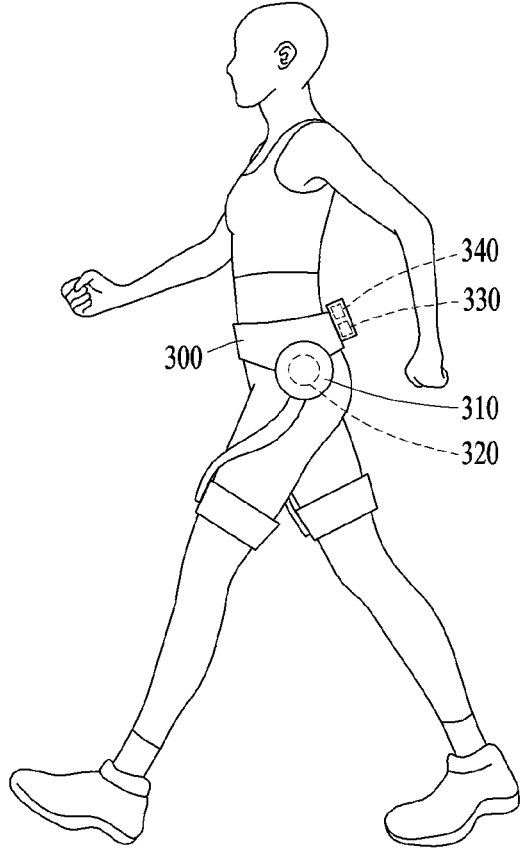
FIGS. 3A, 3B, 3C, and 3D are diagrams illustrating a wearable device according to an example embodiment(s)
Figure 3B:
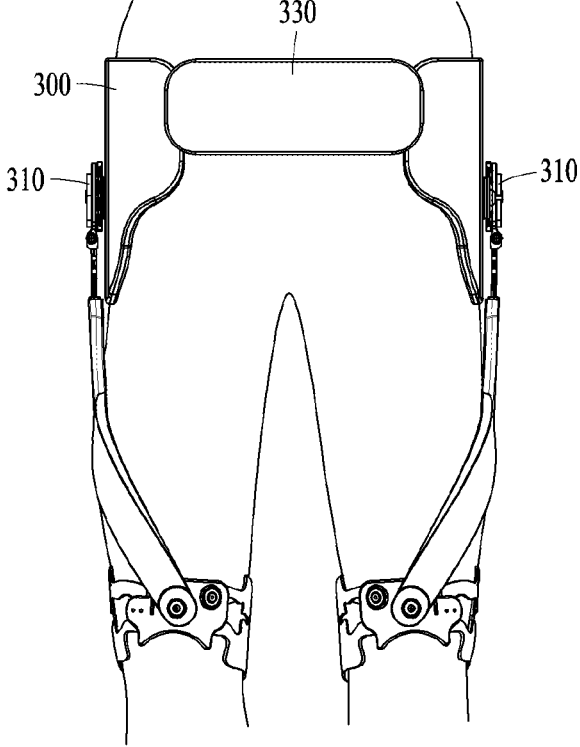
Figure 3C:
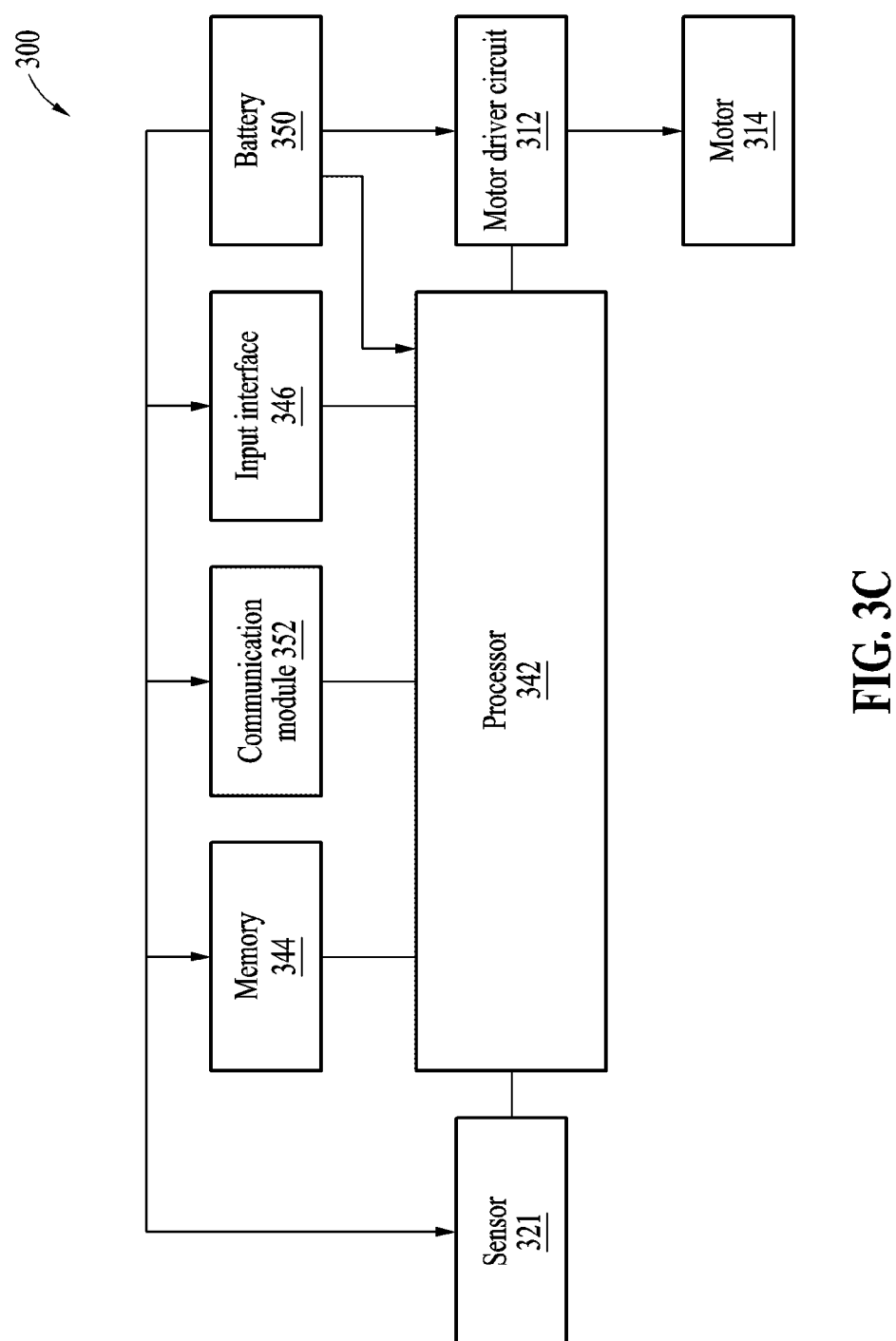
Figure 3D:
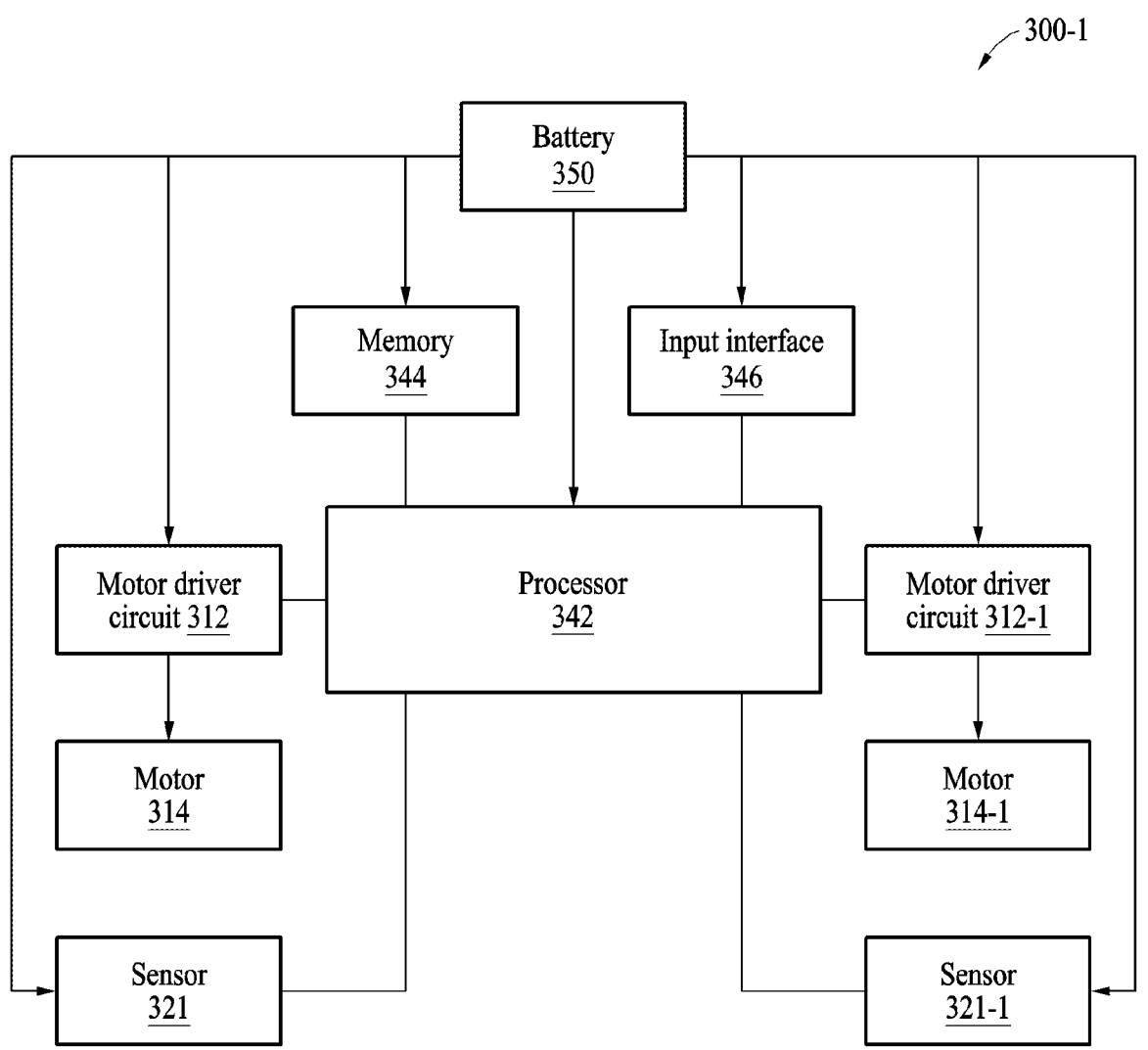

The driver 310 may include a motor 314 and a motor driver circuit 312 for driving the motor 314. The sensor unit 320 may include at least one sensor 321. The controller 340 may include a processor 342, a memory 344, and an input interface 346. Although the wearable device 300 is illustrated in FIG. 3C as including one sensor 321, one motor driver circuit 312, and one motor 314, this may be provided merely as an example, and a wearable device 300-1 may include a plurality of sensors 321 and 321-1, a plurality of motor driver circuits 312 and 312-1, and a plurality of motors 314 and 314-1 according to another example as illustrated in FIG. 3D. Also, according to implementation, the wearable device 300 may include a plurality of processors. The number of motor driver circuits, the number of motors, or the number of processors may vary depending on a body part on which the wearable device 300 is worn.

The following description of the sensor 321, the motor driver circuit 312, and the motor 314 may also apply to the sensor 321-1, the motor driver circuit 312-1, and the motor 314-1 illustrated in FIG. 3D.

The driver 310 may drive a hip joint of a user. For example, the driver 310 may be positioned on the right hip portion and/or the left hip portion of the user. The driver 310 may be additionally positioned on the knee portions and the ankle portions of the user. The driver 310 may include the motor 314 for generating a rotational torque and the motor driver circuit 312 for driving the motor 314.

The sensor unit 320 may measure the angles of the hip joints of the user during a gait. Information on the angles of the hip joints sensed by the sensor unit 320 may include the angle of the right hip joint, the angle of the left hip joint, the difference between the angles of both hip joints, and the hip joint motion direction. For example, the sensor 321 may be positioned in the driver 310. According to the position of the sensor 321, the sensor unit 320 may additionally measure the angles of the knees and the angles of the ankles of the user. The sensor 321 may be an encoder. The information on the angles of the joints measured by the sensor unit 320 may be transmitted to the controller 340.

According to one aspect, the sensor unit 320 may include a potentiometer. The potentiometer may sense an R-axis joint angle, an L-axis joint angle, an R-axis joint angular velocity, and an L-axis joint angular velocity according to a gait motion of the user. In this example, the R and L axes may be reference axes for the right leg and the left leg of the user, respectively. For example, the R and L axes may be set to be vertical to the ground and set such that a front side of a body of a person has a negative value and a rear side of the body has a positive value.

The IMU 330 may measure acceleration information and pose information during a gait. For example, the IMU 330 may sense X-axis, Y-axis, and Z-axis accelerations and X-axis, Y-axis, and Z-axis angular velocities according to the gait motion of the user (e.g., see x, y and z axes in FIGS. 5-6). The acceleration information and pose information measured by the IMU 330 may be transmitted to the controller 340.

In addition to the sensor unit 320 and the IMU 330 described above, the wearable device 300 may include another sensor (e.g., an electromyogram (EMG) sensor) configured to sense a change in a quantity of motion of the user or a change in a biosignal according to a gait motion.

The controller 340, comprising processing circuitry, may control an overall operation of the wearable device 300. For example, the controller 340 may receive the information sensed by each of the sensor unit 320 and the IMU 330. The information sensed by the IMU 330 may include acceleration information and pose information, and the information sensed by the sensor unit 320 may include the angle of the right hip joint, the angle of the left hip joint, the difference between the angles of the two hip joints, and the hip joint motion direction. According to an example embodiment, the controller 340 may also calculate the difference between the angles of both hip joints based on the angle of the right hip joint and the angle of the left hip joint. The controller 340 may generate a signal for controlling the driver 310 based on the sensed information. For example, the generated signal may be an assistance force for assisting a gait of the user. Alternatively, the generated signal may be a resistance force for impeding a gait of the user. The resistance force may be provided to the user to assist the user in doing a workout.

In an example, the processor 342 of the controller 340 may control the driver 310 to provide the user with a resistance force.

For example, the driver 310 may provide the user with a resistance force by applying an active force to the user through the motor 314. The driver 310 may provide the resistance force to the user by outputting a torque in a direction that hinders a motion of the user.

Alternatively, the driver 310 may provide the user with a resistance force using the back-drivability of the motor 314, without applying an active force to the user. The back-drivability of the motor may be a responsiveness of the rotation axis of the motor to an external force. When the back-drivability of the motor increases, the motor may more readily respond to an external force acting on the rotation axis of the motor (that is, the rotation axis of the motor may more readily rotate). For example, even when the same external force is applied to the rotation axis of the motor, a degree of rotation of the rotation axis of the motor may change according to a degree of the back-drivability.

According to an example embodiment, the processor 342 of the controller 340 may control the driver 310 such that the driver 310 may output a torque (or an assistance torque) for assisting a gait of the user. For example, in the hip-type wearable device 300, the driver 310 may be disposed on each of the left hip portion and the right hip portion, and the controller 340 may output a control signal for controlling the driver 310 to generate a torque.

The driver 310 may generate a torque based on the control signal output by the controller 340. A torque value for generating the torque may be externally set or be set by the controller 340. For example, to indicate a magnitude of the torque value, the controller 340 may use a magnitude of a current for the signal transmitted to the driver 310. That is, as the magnitude of the current received by the driver 310 increases, the torque value may increase. As another example, the processor 342 of the controller 340 may transmit the control signal to the motor driver circuit 312 of the driver 310, and the motor driver circuit 312 may generate a current corresponding to the control signal to control the motor 314.

The battery 350 may supply power to the components of the wearable device 300. The wearable device 300 may further include a circuit (e.g., a power management integrated circuit (PMIC)) configured to convert the power of the battery 350 according to an operating voltage of the components of the wearable device 300 and provide the same to the components of the wearable device 300. In addition, the battery 350 may or may not supply power to the motor 314 based on the operation mode of the wearable device 300.

The communication module 352, comprising communication circuitry, may support the establishment of a direct (or wired) communication channel or a wireless communication channel between the wearable device 300 and an external electronic device, and support the communication through the established communication channel. The communication module 352 may include one or more communication processors configured to support direct (or wired) communication or wireless communication. According to an example embodiment, the communication module 352 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device via a first network (e.g., a short-range communication network such as Bluetooth™, wireless-fidelity (Wi-Fi) direct, or infrared data association (IrDA)) or a second network (e.g., a legacy cellular network, a 5G network, a next-generation communication network, the Internet, or a computer network). These various types of communication modules may be implemented as a single component (e.g., a single chip), or may be implemented as multi components (e.g., multi chips) separate from each other.

Figure 4:
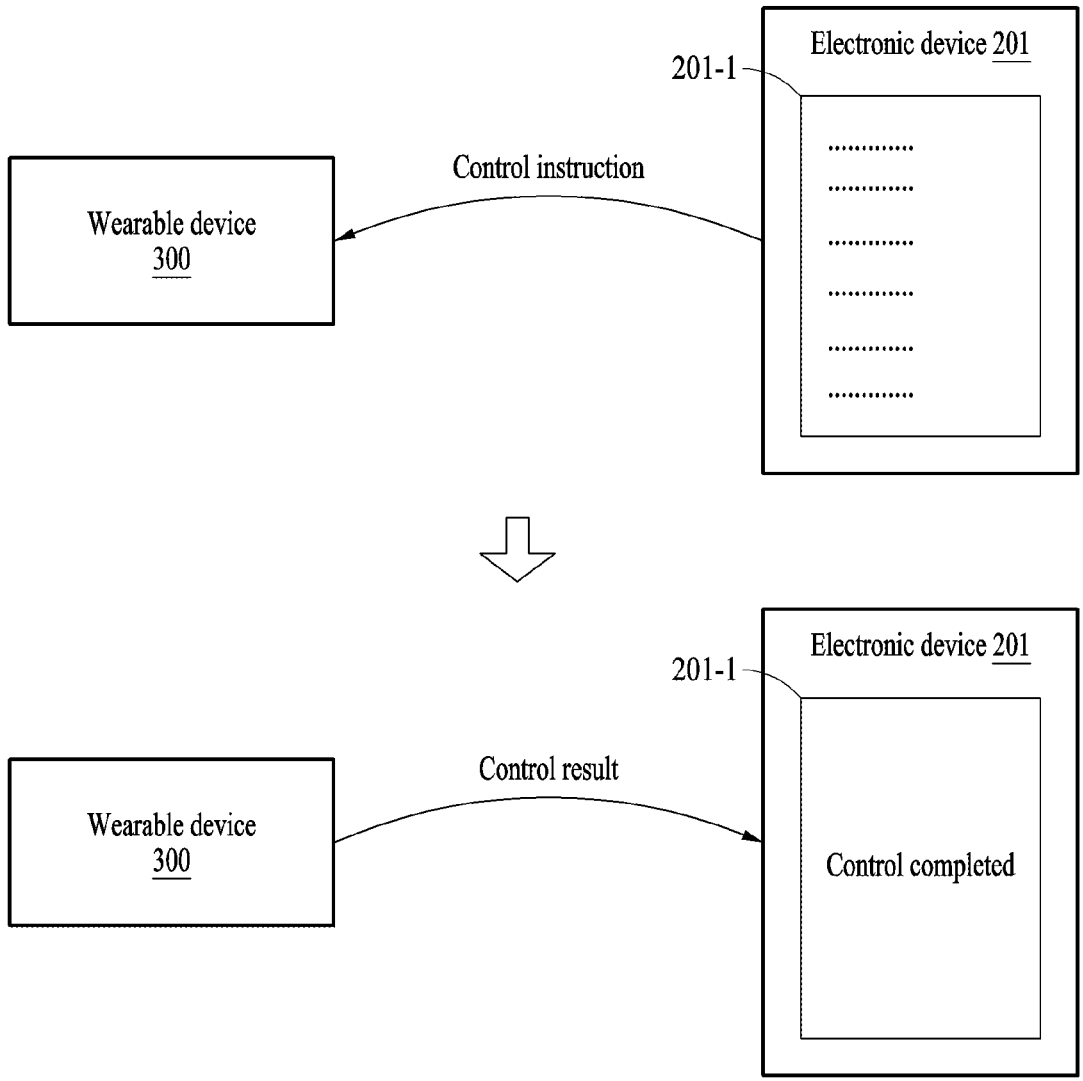
FIG. 4 is a diagram illustrating a wearable device communicating with an electronic device according to an example embodiment.

FIG. 4 is a diagram illustrating a wearable device communicating with an electronic device according to an example embodiment.

Referring to FIG. 4, the wearable device 300 may communicate with the electronic device 201. For example, the electronic device 201 may be an electronic device of a user of the wearable device 300. According to an example embodiment, the wearable device 300 and the electronic device 201 may be connected using a short-range wireless communication method.

The electronic device 201 may display a user interface (UI) for controlling an operation of the wearable device 300 on a display 201-1. The UI may include, for example, at least one soft key through which the user may control the wearable device 300.

The user may input a command for controlling the operation of the wearable device 300 through the UI on the display 201-1 of the electronic device 201, and the server 140 may generate a control instruction corresponding to the command and transmit the generated control instruction to the wearable device 300. The wearable device 300 may operate according to the received control instruction, and transmit a control result to the electronic device 201. The electronic device 201 may display a control completion message on the display 201-1 of the electronic device 201.

Figure 5:
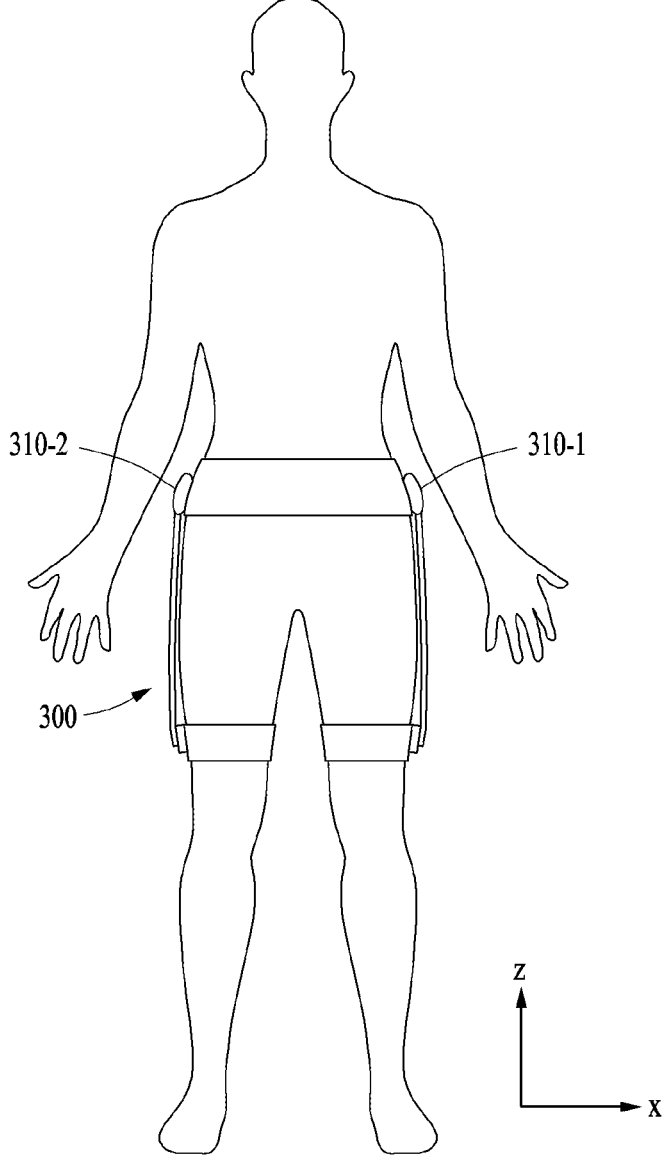
FIGS. 5 and 6 are diagrams illustrating a torque output method of a wearable device according to an example embodiment.
Figure 6:
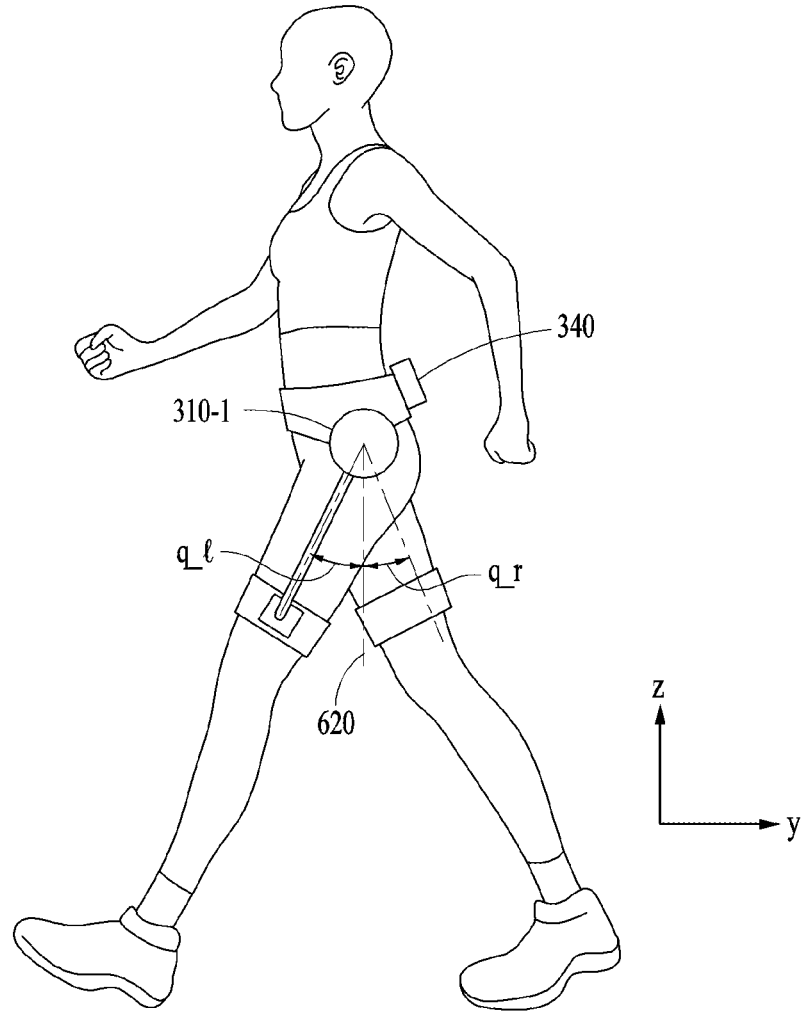

FIGS. 5 and 6 are diagrams illustrating a torque output method of a wearable device according to an example embodiment.

Referring to FIGS. 5 and 6, drivers 310-1 and 310-2 of the wearable device 300 of FIG. 3 may be disposed near the hip joints of a user, and the controller 340 of the wearable device 300 may be disposed near the lower back of the user. The positions of the drivers 310-1 and 310-2 and the controller 340 are not limited to the example positions illustrated in FIGS. 5 and 6.

The wearable device 300 may measure (and/or sense) a left hip joint angle q_l and a right hip joint angle q_r of the user. As an example, the wearable device 300 may measure the left hip joint angle q_l of the user through a left encoder and measure the right hip joint angle q_r of the user through a right encoder. As illustrated in FIG. 6, the left hip angle q_l may be negative because the left leg of the user is before a reference line 620, and the right hip angle q_r may be positive because the right leg of the user is behind the reference line 620. According to implementation, the right hip joint angle q_r may be negative when the right leg is before the reference line 620, and the left hip joint angle q_/may be positive when the left leg is behind the reference line 620.

According to an example embodiment, the wearable device 300 may obtain a first angle (e.g., q_r) and a second angle (e.g., q_l) by filtering a first raw angle (e.g., q_r_raw) of a first joint (e.g., the right hip joint) and a second raw angle (e.g., q_l_raw) of a second joint (e.g., the left hip joint) measured by the sensor unit 320. For example, the wearable device 300 may filter the first raw angle and the second raw angle based on a first previous angle and a second previous angle measured with respect to a previous time.

According to an example embodiment, the wearable device 300 may determine a torque value τ(t) based on the left hip joint angle q_l, the right hip joint angle q_r, an offset angle c, a sensitivity α, a gain κ, and a delay Δt, and control the motor driver circuit 312 of the wearable device 300 to output the determined torque value τ(t). The force provided to the user by the torque value τ(t) may be referred to herein as a force feedback. As an example, the wearable device 300 may determine the torque value τ(t) based on Equation 1 below.

$$y=\sin(q\_r)-\sin(q\_l)$$

$$\tau(t)=\kappa y(t-\Delta t) \qquad \text{[Equation 1]}$$

In Equation 1 above, y denotes a state factor, and q_r denotes a right hip joint angle, and q_l denotes a left hip joint angle. According to Equation 1, the state factor y may be associated with the distance between the two legs. For example, y being "O" may indicate a state (e.g., a crossing state) in which the distance between the legs is "0", and the absolute value of y being maximum may indicate a state (e.g., a landing state) in which the angle between the legs is maximum or large. According to an example embodiment, when q_r and q_l are measured at a time t, the state factor may be represented as y(t).

The gain κ is a parameter indicating the magnitude and direction of an output torque. As the magnitude of the gain κ increases, a greater torque may be output. If the gain κ is negative, a torque acting as a resistance force may be output to the user. If the gain κ is positive, a torque acting as an assistance force may be output to the user. The delay Δt is a parameter associated with a torque output timing. The value of the gain κ and the value of the delay Δt may be preset, and may be adjustable by a user or the wearable device 300. A model for outputting a torque acting as an assistance force to a user based on Equation 1 and the parameters such as the gain k and the delay Δt may be defined as a torque output model (e.g., a torque output algorithm). The wearable device 300 may determine the magnitude and delay of a torque to be output by inputting the values of input parameters received through sensors into the torque output model.

According to an example embodiment, the wearable device 300 may determine a first torque value through Equation 2 below by applying a first gain value and a first delay value to a first state factor y(t), wherein the first gain value and the first delay value may be parameter values determined with respect to the state factor y(t).

$$\tau_l(t)=\kappa y(t-\Delta t)$$

$$\tau_r(t)=-\kappa y(t-\Delta t) \qquad \text{[Equation 2]}$$

The calculated first torque value may include a value for the first joint and a value for the second joint since it should be applied to the two legs. For example, τ_l(t) may be a value for the left hip joint, which is the second joint, τ_r(t) may be a value for the right hip joint, which is the first joint. τ_l(t) and τ_r(t) may be values with the same magnitude and opposite torque directions. The wearable device 300 may control the motor driver circuit 312 of the wearable device 300 to output a torque corresponding to the first torque value.

According to an example embodiment, when the user performs an asymmetrical gait with the left leg and the right leg, the wearable device 300 may provide asymmetrical torques respectively to both legs of the user to assist the asymmetric gait (e.g., walk). For example, a stronger assistance force may be provided to a leg with a shorter stride width or a slower swing speed. Hereinafter, a leg with a small stride width or a slow swing speed will be referred to as an affected leg or a target leg.

In general, an affected leg may have a shorter swing time or a smaller stride width than an unaffected leg. According to an example embodiment, a method of adjusting the timing of a torque acting on an affected leg to assist a gait of a user may be considered. For example, an offset angle may be added to an actual joint angle of an affected leg to increase an output time of a torque for assisting a swing motion of the affected leg. c may be the value of a parameter indicating an offset angle between joint angles. As the offset angle is added to the actual joint angle of the affected leg, the value of an input parameter that is input into the torque output model mounted on (and/or applied to) the wearable device 300 may be adjusted. For example, the values of q_r and q_l may be adjusted through Equation 3 below. $c_r$ denotes an offset angle with respect to the right hip joint, and cl denotes an offset angle with respect to the left hip joint.

$$q\_r(t) \leftarrow q\_r(t) + c_r$$

$$q\_l(t) \leftarrow q\_l(t) + c_l \qquad \text{[Equation 3]}$$

According to an example embodiment, the wearable device 300 may filter the state factor to reduce the discomfort the user may experience due to irregular torque outputs. For example, the wearable device 300 may determine an initial state factor $y_{raw}(t)$ of a current time t based on the first angle of the first joint and the second angle of the second joint, and determine the first state factor y(t) based on a previous state factor $y^{prv}$ determined with respect to a previous time t–1 and the initial state factor $y_{raw}(t)$. The current time t may be a time at which t-th data (e.g., sample) is processed, and the previous time t–1 may be a time at which t–1-th data is processed. For example, the difference between the current time t and the previous time t–1 may be an operation interval of a processor for generating or processing the corresponding items of data. The sensitivity $\alpha$ may be the value of a parameter indicating a sensitivity. For example, the sensitivity value may be continuously adjusted during a test gait. However, the sensitivity value may be preset to a predetermined value to reduce the computational complexity.

In the embodiment described above, a method of determining the values of the control parameters by the wearable device 300 has been described. However, the values of the control parameters may be determined by an electronic device (e.g., the electronic device 110 of FIG. 1 or the electronic device 201 of FIG. 2) instead of the wearable device 300. For example, the electronic device may receive sensing data from the wearable device 300, determine values of control parameters based on the sensing data, and control an operation of the wearable device 300 based on the determined values of the control parameters.

Figure 7:
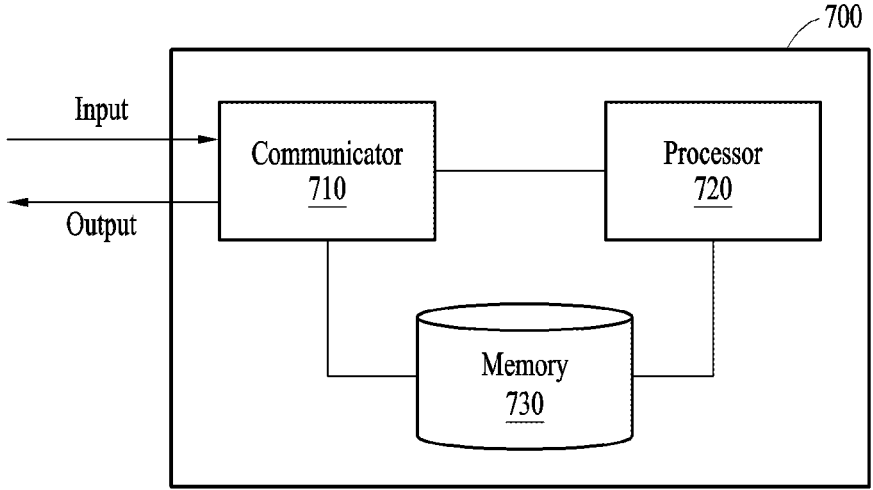
FIG. 7 is a diagram illustrating a configuration of a server according to an example embodiment.

FIG. 7 is a diagram illustrating a configuration of a server according to an example embodiment.

A server 700 may include a communicator 710 comprising communication circuitry, a processor 720 comprising processing circuitry, and a memory 730. For example, the server 700 may be the server 140 described above with reference to FIG. 1.

The communicator 710 may be connected, directly or indirectly, to the processor 720 and the memory 730 and transmit and receive data to and from the processor 720 and the memory 730. The communicator 710 may be connected, directly or indirectly, to another external device and transmit and receive data to and from the external device.

The communicator 710 may be implemented as a circuitry in the server 700. For example, the communicator 710 may include an internal bus and an external bus. In another example, the communicator 710 may be an element that connects the server 700 and the external device. The communicator 710 may be an interface. The communicator 710 may receive data from the external device and transmit the data to the processor 720 and the memory 730.

The processor 720 processes the data received by the communicator 710 and data stored in the memory 730. The "processor" may be a data processing device implemented by hardware including a circuit having a physical structure to perform desired operations. The desired operations may include, for example, code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA). Each processor herein comprises processing circuitry.

The processor 720 may execute computer-readable code (e.g., software) stored in a memory (e.g., the memory 730) and instructions triggered by the processor 720.

The memory 730 may store therein the data received by the communicator 710 and the data processed by the processor 720. For example, the memory 730 may store the program (or an application, or software). The stored program may be a set of syntax coded and executable by the processor 720 to generate a plurality of workout programs for the user and recommend a target workout program among the plurality of workout programs to the user.

According to one aspect, the memory 730 may include, for example, at least one volatile memory, nonvolatile memory, random-access memory (RAM), flash memory, a hard disk drive, and an optical disc drive.

The memory 730 may store an instruction set (e.g., software) for operating the server 700. The instruction set for operating the server 700 may be executed by the processor 720. According to an example embodiment, the memory 730 may include a database including information on a plurality of workout modes. According to an example embodiment, the memory 730 may include a database that stores a history of workout programs performed by a plurality of users.

Figure 8:
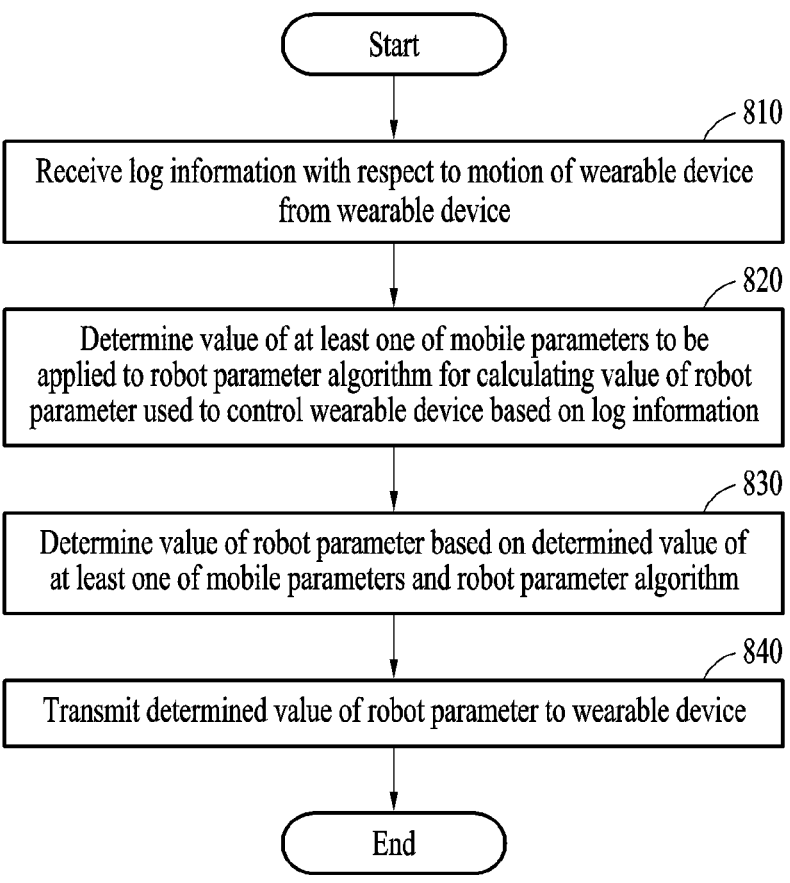
FIG. 8 is a flowchart illustrating a method of determining a value of a robot parameter according to an example embodiment.

FIG. 8 is a flowchart illustrating a method of determining a value of a robot parameter according to an example embodiment.

According to an example embodiment, the following operations 810 to 840 may be performed by an electronic device (e.g., the electronic device 110 of FIG. 1, the server 140 of FIG. 1, the electronic device 201 of FIG. 2, or the server 700 of FIG. 7).

In operation 810, the electronic device may receive, from a wearable device (e.g., the wearable device 120 of FIG. 1 or the wearable device 300 of FIG. 3), log information with respect to a motion of the wearable device. For example, the log information may include at least one of joint angle information, joint angular velocity information, inertial measurement unit (IMU) information, or global positioning system (GPS) information of the wearable device. For example, first log information may include sensor information measured (or generated) at a first time, and second log information may include sensor information measured (or generated) at a second time. The plurality of log information may be time series data.

For example, a user may perform a workout program or perform a freestyle gait while wearing the wearable device. The wearable device may continuously generate log information with respect to a motion of the wearable device that changes based on a motion of the user.

In operation 820, the electronic device may determine a value of at least one of mobile parameters to be applied to a robot parameter algorithm for calculating a value of a robot parameter (or a control parameter) used to control the wearable device based on the log information.

According to an example embodiment, the robot parameter algorithm may be a function or pretrained model for receiving at least one of user information, a user feature, workout summary information, or a mobile parameter as an input and outputting a value of a robot parameter based on the received values. For example, the robot parameters output through the robot parameter algorithm may include parameters for adjusting at least one of a magnitude (or a gain) of a torque to be output through the wearable device, a direction of the torque, a timing of the torque, an offset angle between joint angles of the wearable device, or a sensitivity of a state factor with respect to the joint angles.

According to an example embodiment, the user information may include at least one of the age, height, leg length, weight, gender, or body composition analysis information of the user. For example, the electronic device may receive the user information through a user interface before operation 810 is performed.

According to an example embodiment, the user feature may be a feature with respect to an athletic ability of the user determined based on the log information. For example, the user feature may include at least one of a gait age, a muscular strength, a gait symmetricity, or a gait rhythm. For example, the user feature may include at least one of the presence or absence of a fall experience or a pathological gait degree. A method of generating the user feature will be described in detail below with reference to FIG. 9.

According to an example embodiment, the workout summary information may be information on workout records of the user determined based on the log information. For example, the workout summary information may include at least one of a date of workout, a duration of workout, an average stride width, an average gait speed, or consumed calories that are associated with a workout performed by the user. A method of generating the workout summary information will be described in detail below with reference to FIG. 10.

According to an example embodiment, the type of the mobile parameter to be applied to the robot parameter algorithm and the value of the mobile parameter may be determined differently according to the robot parameter algorithm. For example, when the robot parameter algorithm is an algorithm for outputting a value of a gain as a robot parameter for a resistance workout, the mobile parameter may be information on the length of a workout period to be input to the robot parameter algorithm. In the above example, when the user has recently performed a workout a fewer number of times, the length of the workout period to be input to the robot parameter algorithm may be determined to be two weeks. In the above example, when the gait speed of the user tends to decrease, the value of the gain as the robot parameter may be a value lower than a previous value.

According to an example embodiment, the electronic device may store a plurality of robot parameter algorithms respectively corresponding to different robot parameters, and determine values of mobile parameters to be respectively applied to the plurality of robot parameter algorithms. A method of determining the value of at least one of the mobile parameters will be described in detail below with reference to FIGS. 9 to 12.

In operation 830, the electronic device may determine the value of the robot parameter based on the robot parameter algorithm and the determined value of at least one of the mobile parameters.

According to an example embodiment, the electronic device may determine the value of the robot parameter by inputting, into the robot parameter algorithm, a first value of a first mobile parameter among the one or more mobile parameters and at least one of the workout summary information or the user feature. For example, when the robot parameter algorithm is an algorithm for outputting a value of a gain as a robot parameter for a resistance workout, the mobile parameter may be information on the length of a workout period to be input to the robot parameter algorithm. In the above example, when the user has recently performed a workout a fewer number of times, the length of the workout period to be input to the robot parameter algorithm may be determined to be two weeks. In the above example, when the gait speed of the user tends to decrease during the workout period, the value of the gain as the robot parameter may be a value lower than a previous value.

According to an example embodiment, the electronic device may determine the respective values of the plurality of robot parameters. A robot parameter value set may be determined to include the values of the plurality of robot parameters.

In operation 840, the electronic device may transmit the determined value of the robot parameter to the wearable device.

According to an example embodiment, the electronic device may be a user terminal, and the user terminal may transmit the value of the robot parameter to the wearable device through a short-range wireless communication channel established between the electronic device and the user terminal.

According to an example embodiment, the electronic device may be a server, and the server may transmit the value of the robot parameter to the wearable device through a user terminal connected, directly or indirectly, to the server.

According to an example embodiment, the wearable device receiving the value of the robot parameter may control an operation of the wearable device based on the value of the robot parameter. For example, a magnitude (or a gain) of a torque to be output to the user, a direction of the torque, or a timing of the torque may be controlled based on the value of the robot parameter. For example, the wearable device may calculate a state factor based on sensing data obtained through a sensor of the wearable device, and control the operation of the wearable device based on the calculated state factor and the received value of the robot parameter.

Figure 9:
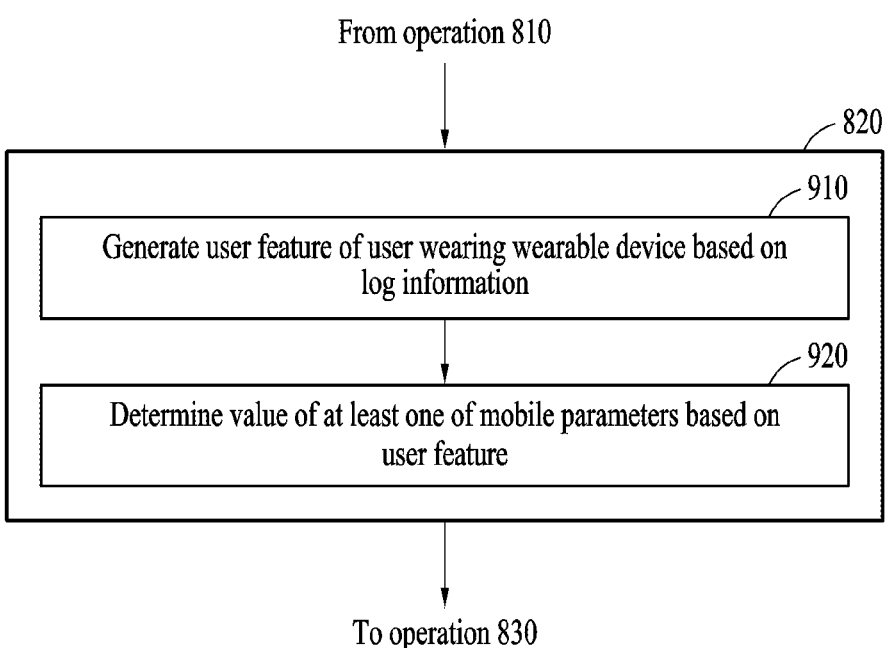
FIG. 9 is a flowchart illustrating a method of determining a value of at least one of mobile parameters based on a user feature according to an example.

FIG. 9 is a flowchart illustrating a method of determining a value of at least one of mobile parameters based on a user feature according to an example embodiment.

According to an example embodiment, operation 820 described above with reference to FIG. 8 may include operations 910 and 920 to be described hereinafter. Operations 910 and 920 may be performed by an electronic device (e.g., the electronic device 110 of FIG. 1, the server 140 of FIG. 1, the electronic device 201 of FIG. 2, or the server 700 of FIG. 7).

In operation 910, the electronic device may generate a user feature of a user wearing the wearable device based on the log information.

According to an example embodiment, the electronic device may generate the user feature by inputting the log information and a reference value of a user feature mobile parameter (or a mobile parameter for a user feature) among the mobile parameters into a user feature algorithm. The user feature algorithm may be a function or pretrained model for receiving the log information and the value of the user feature mobile parameter as an input and outputting the user feature based on the received values. For example, the user feature may include at least one of a gait age, a muscular strength, a gait symmetricity, or a gait rhythm.

According to an example embodiment, the user feature mobile parameter may be a parameter for classifying a level of a predetermined value received through the log information, and the reference value of the user feature mobile parameter may be determined based on the user information of the user. For example, when the predetermined value received through the log information is a measured value of a lower body muscular strength of the user, the user feature mobile parameter may be a parameter for classifying the level of the lower body muscular strength of the user, and the reference value of the user feature mobile parameter may be a threshold value for classifying the level of the lower body muscular strength. The user feature generated in the above example may be a target level (e.g., high, moderate, or low) of the lower body muscular strength of the user. For example, when the obtained lower body muscular strength of the user is "6" Nm, the target level of the lower body muscular strength may be determined to be moderate for a user in their 30s, and the target level of the lower body muscular strength may be determined to be high for a user in their 90s.

In operation 920, the electronic device may determine the value of at least one of the mobile parameters based on the user feature.

According to an example embodiment, the electronic device may determine the value of the mobile parameter for the robot parameter from among the mobile parameters input to the robot parameter algorithm based on the user feature.

Figure 10:
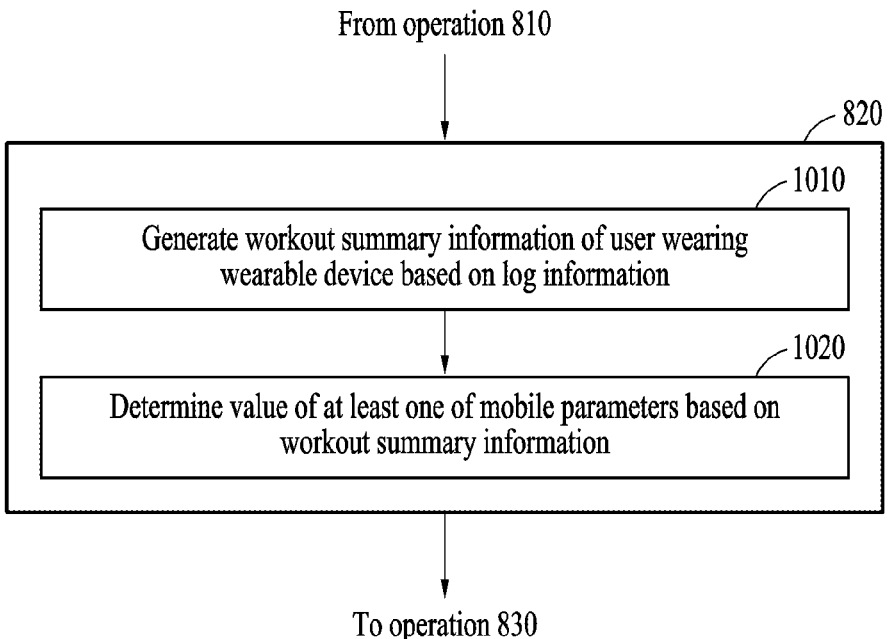
FIG. 10 is a flowchart illustrating a method of determining a value of at least one of mobile parameters based on workout summary information according to an example.

FIG. 10 is a flowchart illustrating a method of determining a value of at least one of mobile parameters based on workout summary information according to an example embodiment.

According to an example embodiment, operation 820 described above with reference to FIG. 8 may include operations 1010 and 1020 to be described hereinafter. Operations 1010 and 1020 may be performed by an electronic device (e.g., the electronic device 110 of FIG. 1, the server 140 of FIG. 1, the electronic device 201 of FIG. 2, or the server 700 of FIG. 7).

In operation 1010, the electronic device may generate workout summary information of a user wearing the wearable device based on the log information.

According to an example embodiment, the electronic device may generate the workout summary information by inputting the log information and a reference value of a workout summary information mobile parameter (or a mobile parameter for workout summary information) among the mobile parameters into a workout summary information algorithm. The workout summary information algorithm may be a function or pretrained model for receiving the log information and the value of the workout summary information mobile parameter as an input and outputting the workout summary information based on the received values. For example, the workout summary information may include at least one of a date of workout, a duration of workout, an average stride width, an average gait speed, or consumed calories.

According to an example embodiment, the workout summary information mobile parameter may be a parameter for accumulating workout records received through the log information, and the reference value of the workout summary information mobile parameter may be determined based on the user information of the user. For example, when a joint angle is received as the workout records received through the log information, the workout summary information mobile parameter may be a parameter indicating the length of a leg of the user, and the reference value of the workout summary information mobile parameter may be a target length of a leg received from the user. The workout summary information generated in the above example may be an average stride width of the user.

In operation 1020, the electronic device may determine the value of at least one of the mobile parameters based on the workout summary information.

According to an example embodiment, the electronic device may determine the value of the mobile parameter for the robot parameter from among the mobile parameters input to the robot parameter algorithm based on the workout summary information.

Figure 11:
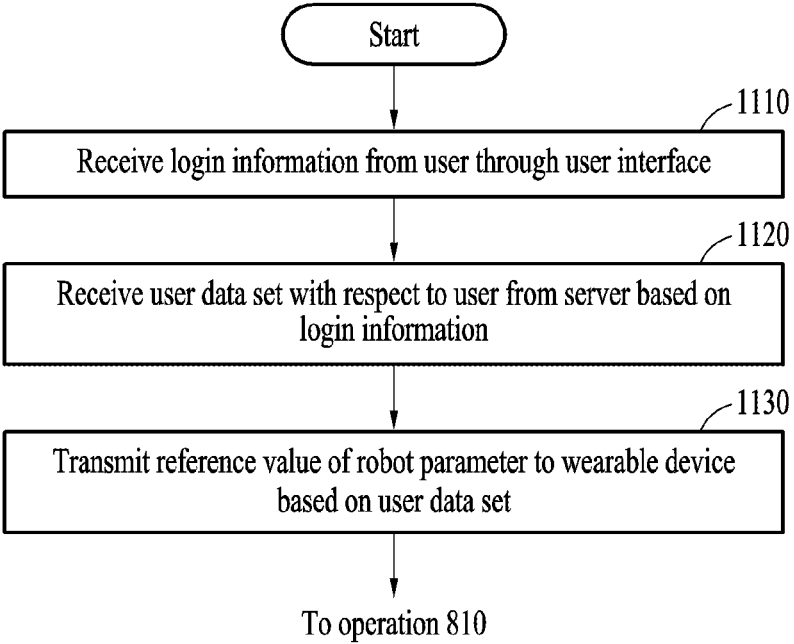
FIG. 11 is a flowchart illustrating a method of transmitting a reference value of a robot parameter to a wearable device based on a user data set received from a server according to an example.

FIG. 11 is a flowchart illustrating a method of transmitting a reference value of a robot parameter to a wearable device based on a user data set received from a server according to an example embodiment.

According to an example embodiment, the following operations 1110 to 1130 may be performed by an electronic device (e.g., the electronic device 110 of FIG. 1 or the electronic device 201 of FIG. 2), which is a user terminal. For example, operations 1110 to 1130 may be performed before operation 810 of FIG. 8 is performed.

In operation 1110, the electronic device may receive login information from a user through a user interface. For example, the electronic device may receive login information (e.g., an identifier and a password) from the user through a user interface configured to receive information from the user. For example, the login information may be used by the user to log in to a user account stored in a server (e.g., the server 140 of FIG. 1 or the server 700 of FIG. 7) through the electronic device.

In operation 1120, the electronic device may receive a user data set with respect to the user from a server based on the login information.

According to an example embodiment, the user data set may include at least one of log information of the user, a user feature, workout summary information, values of mobile parameters, or values of robot parameters. For example, the values of the mobile parameters and the values of the robot parameters in the user data set may be the most recently determined (or updated) values.

In operation 1130, the electronic device may transmit a reference value of the robot parameter to the wearable device based on the user data set. For example, the reference value of the robot parameter may be the most recently determined (or updated) values. For example, the reference value of the robot parameter may be a basic value for testing a motion of the user. When the reference value of the robot parameter is a basic value for testing a motion of the user, the log information generated by the wearable device may be test log information.

According to an example embodiment, a wearable device (e.g., the wearable device 120 of FIG. 1 or the wearable device 300 of FIG. 3) may output a torque to the user wearing the wearable device based on the reference value of the robot parameter. For example, a torque corresponding to the motion of the user may be output.

According to an example embodiment, the wearable device may generate log information with respect to a motion of the wearable device corresponding to the motion of the user with respect to the output torque. The wearable device may transmit the log information to the electronic device (e.g., operation 810 of FIG. 8).

FIG. 12 is a flowchart illustrating a method of determining an optimal value of a mobile parameter based on a test motion of a wearable device according to an example embodiment.

According to an example embodiment, operation 820 described above with reference to FIG. 8 may include operations 1210, 1220, and 1230 to be described hereinafter. Operations 1210, 1220, and 1230 may be performed by an electronic device (e.g., the electronic device 110 of FIG. 1, the server 140 of FIG. 1, the electronic device 201 of FIG. 2, or the server 700 of FIG. 7).

In operation 1210, the electronic device may generate, when the log information is test log information with respect to a test motion, a first simulation result based on the test log information and an initial value of a first mobile parameter among the mobile parameters.

For example, when the user is instructed to walk 10 m, the wearable device may generate test log information with respect to a 10-m gait motion. The electronic device may calculate a gait distance of the user using the initial value of the first mobile parameter among the mobile parameters based on the test log information. The calculated gait distance may be the first simulation result. For example, the first mobile parameter may be a mobile parameter for a user feature, a mobile parameter for workout summary information, or a mobile parameter for a robot parameter.

In operation 1220, the electronic device may calculate a difference between a preset result with respect to the test motion and the first simulation result. For example, a difference between the calculated gait distance and an actual value of 10 m may be calculated.

In operation 1230, the electronic device may determine an optimal value of the first mobile parameter based on the calculated difference between the preset result and the first simulation result. For example, the optimal value of the first mobile parameter may be determined based on the test log information so that the gait distance of the user calculated using the value of the first mobile parameter may correspond to the actual value of 10 m.

According to an example embodiment, the optimal value of the first mobile parameter to be applied to a first algorithm (e.g., a user feature algorithm, a workout summary information algorithm, or a robot parameter algorithm) used to calculate the gait distance of the user may be determined.

According to an example embodiment, the electronic device may calculate not only the optimal value of the mobile parameter to be applied to the first algorithm but also an optimal value of a mobile parameter to be applied to a second algorithm. For example, optimal values of the plurality of mobile parameters may be determined by performing operations 1210 to 1230 for each of the plurality of mobile parameters.

Figure 13:
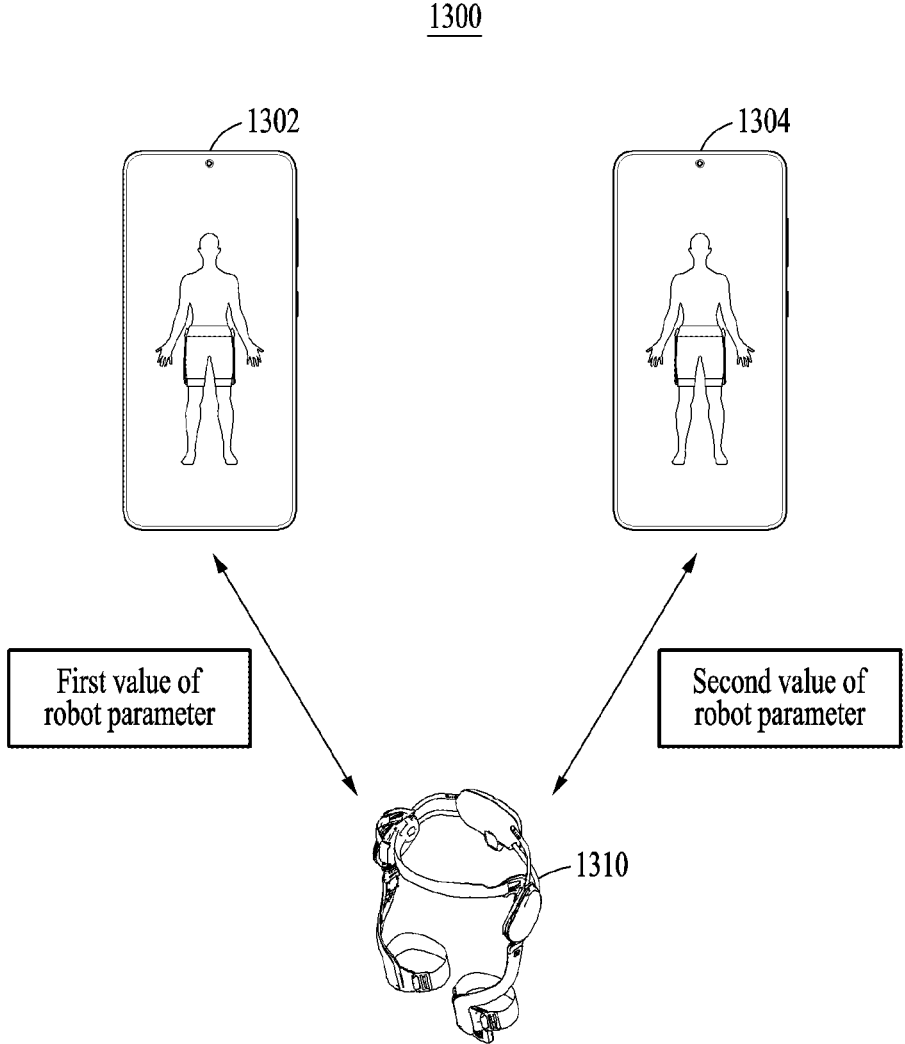
FIG. 13 illustrates a first use environment of a wearable device according to an example.

FIG. 13 illustrates a first use environment of a wearable device according to an example embodiment.

According to an example embodiment, a first use environment 1300 may include a plurality of user terminals 1302 and 1304 (e.g., the electronic device 110 of FIG. 1 or the electronic device 201 of FIG. 2) and a wearable device 1310 (e.g., the wearable device 120 of FIG. 1 or the wearable device 300 of FIG. 3). For example, the first use environment 1300 may be an environment in which a plurality of users having respective user terminals share and use one wearable device 1310. For example, the first use environment 1300 may be an environment in which family members use one wearable device 1310.

According to an example embodiment, the first user terminal 1302 may be a terminal of a first user, and may transmit a first value of a robot parameter with respect to the first user to the wearable device 1310 when the first user uses the wearable device 1310. For example, the first user terminal 1302 may determine the first value of the robot parameter with respect to the first user based on the first value of the mobile parameter personalized with respect to the first user, and transmit the determined first value of the robot parameter to the wearable device 1310. The wearable device 1310 may control a motion of the wearable device 1310 with respect to a motion of the first user based on the first value of the robot parameter received from the first user terminal 1302.

According to an example embodiment, the second user terminal 1304 may be a terminal of a second user, and may transmit a second value of a robot parameter with respect to the second user to the wearable device 1310 when the second user uses the wearable device 1310. For example, the second user terminal 1304 may determine the second value of the robot parameter with respect to the second user based on the second value of the mobile parameter personalized with respect to the second user, and transmit the determined second value of the robot parameter to the wearable device 1310. The wearable device 1310 may control a motion of the wearable device 1320 with respect to a motion of the second user based on the second value of the robot parameter received from the second user terminal 1304.

Since the value of a personalized mobile parameter varies depending on a user, the value of a robot parameter to be output based on the same may also vary.

Figure 14:
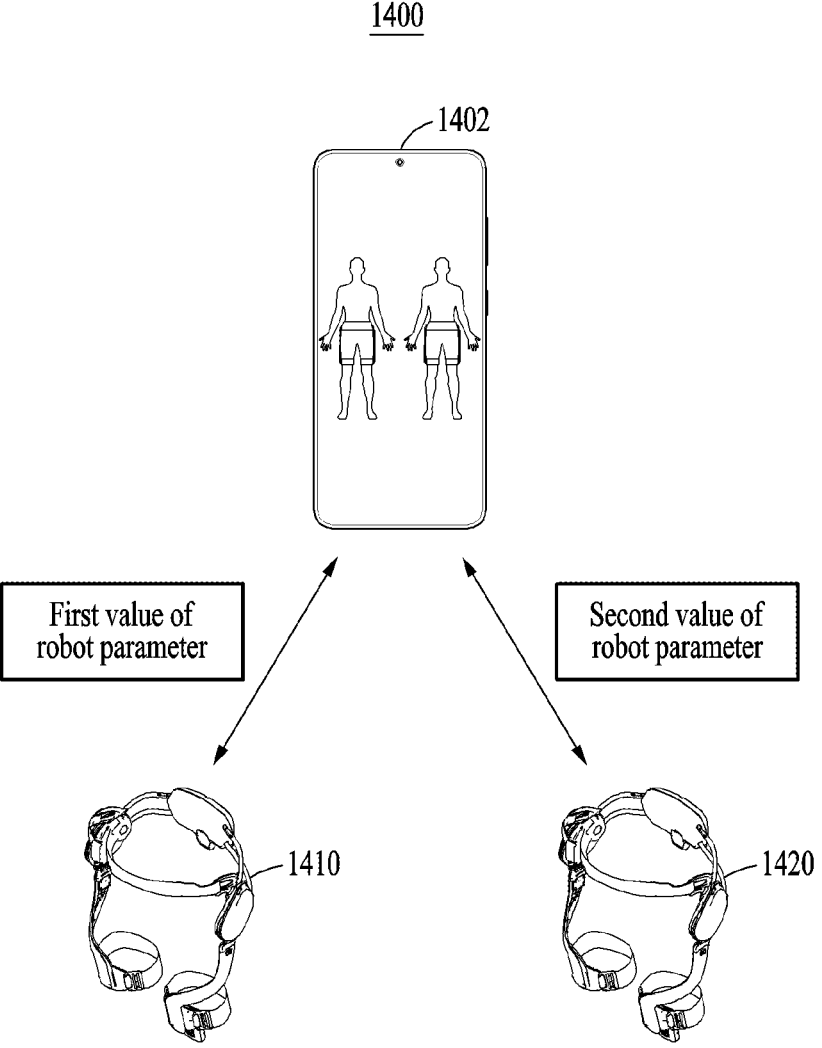
FIG. 14 illustrates a second use environment of a wearable device according to an example.

FIG. 14 illustrates a second use environment of a wearable device according to an example embodiment.

According to an example embodiment, a second use environment 1400 may include a user terminal 1402 (e.g., the electronic device 110 of FIG. 1 or the electronic device 201 of FIG. 2) and a plurality of wearable devices 1410 and 1420 (e.g., the wearable device 120 of FIG. 1 or the wearable device 300 of FIG. 3). For example, the second use environment 1400 may be an environment in which another user (e.g., a health trainer), other than users wearing the plurality of wearable devices 1410 and 1420, simultaneously controls the plurality of wearable devices 1410 and 1420 worn by the plurality of users using the user terminal 1402. For example, the second use environment 1400 may be an environment in which the health trainer helps the plurality of users to work out using the plurality of wearable devices 1410 and 1420.

According to an example embodiment, the user terminal 1402 may be a terminal used by the health trainer, and may transmit a first value of a robot parameter with respect to a first user to the first wearable device 1410 worn by the first user and transmit a second value of a robot parameter with respect to a second user to the second wearable device 1420 worn by the second user.

For example, the user terminal 1402 may determine the first value of the robot parameter with respect to the first user based on a first value of a mobile parameter personalized for the first user, and determine the second value of the robot parameter with respect to the second user based on a second value of a mobile parameter personalized for the second user.

The first wearable device 1410 may control a motion of the first wearable device 1410 with respect to a motion of the first user based on the first value of the robot parameter received from the user terminal 1402. The second wearable device 1420 may control a motion of the second wearable device 1420 with respect to a motion of the second user based on the second value of the robot parameter received from the user terminal 1402.

According to the second use environment 1400, even when the trainer makes the plurality of users perform the same workout program, different workout loads may be provided to the plurality of users based on the values of mobile parameters personalized for the users.

Figure 15:
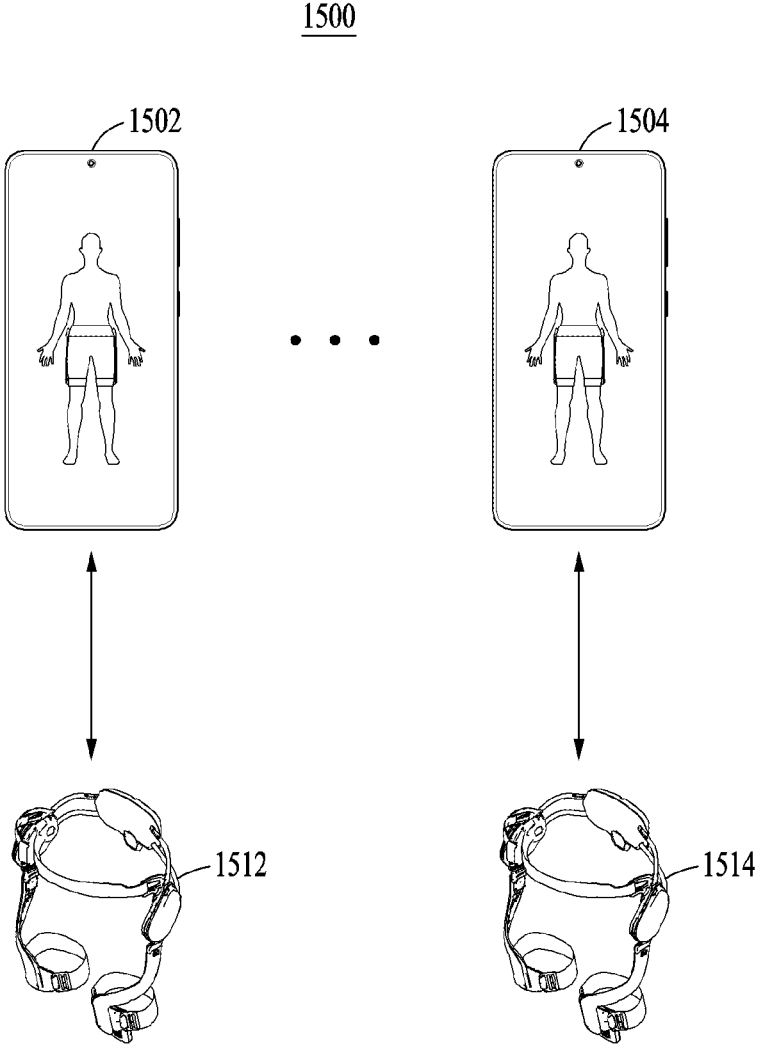
FIG. 15 illustrates a third use environment of a wearable device according to an example.

FIG. 15 illustrates a third use environment of a wearable device according to an example embodiment.

According to an example embodiment, a third use environment 1500 may include a plurality of user terminals 1502 and 1504 (e.g., the electronic device 110 of FIG. 1 or the electronic device 201 of FIG. 2) and a plurality of wearable devices 1512 and 1514 (e.g., the wearable device 120 of FIG. 1 or the wearable device 300 of FIG. 3). For example, the third use environment 1500 may be an environment in which a plurality of users use the plurality of wearable devices 1512 and 1514. For example, the third use environment 1500 may be an environment in which a value of a mobile parameter personalized for a first user of the first user terminal 1502 is stored in the first user terminal 1502 and the first user uses a different wearable device each time. For example, the third use environment 1500 may be an environment in which the plurality of users share and use the plurality of wearable devices 1512 and 1514.

Figure 16:
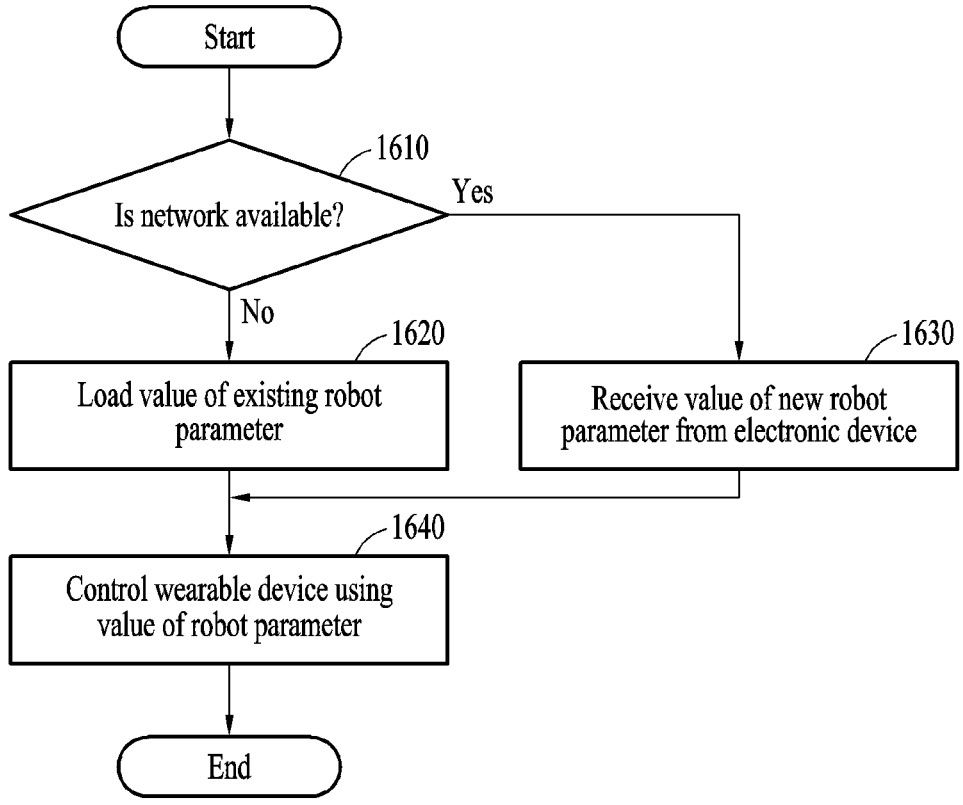
FIG. 16 is a flowchart illustrating a method of controlling a wearable device according to an example.

FIG. 16 is a flowchart illustrating a method of controlling a wearable device according to an example embodiment.

According to an example embodiment, the following operations 1610 to 1640 may be performed by a wearable device (e.g., the wearable device 120 of FIG. 1 or the wearable device 300 of FIG. 3).

In operation 1610, the wearable device may determine whether a network is available. For example, the wearable device may determine whether short-range wireless communication or cellular communication is possible.

When a network is not available, the wearable device may load a value of an existing robot parameter stored in the wearable device, in operation 1620. For example, the value of the existing robot parameter may be a first value of a robot parameter with respect to a first user wearing the wearable device among values of robot parameters with respect to a plurality of users stored in the wearable device. For example, the value of the existing robot parameter may be the value of the most recently used robot parameter.

When a network is available, the wearable device may receive a value of a new robot parameter from an electronic device (e.g., the electronic device 110 of FIG. 1, the server 140 of FIG. 1, the electronic device 201 of FIG. 2, or the server 700 of FIG. 7) connected, directly or indirectly, to the wearable device, in operation 1630.

According to an example embodiment, the value of the new robot parameter may be a value of a robot parameter determined based on a value of a mobile parameter personalized based on log information of the user.

In operation 1640, the wearable device may control the wearable device using the value of the robot parameter.

According to an example embodiment, the wearable device may use the value of the robot parameter to output a torque corresponding to a motion of the user. A magnitude (or a gain) of a torque to be provided to the user, a direction of the torque, and a timing of the torque may be controlled based on the value of the robot parameter.

According to an example embodiment, an electronic device (e.g., 110; 140; 201; 700) may include a communication module (e.g., 290; 710 comprising communication circuitry) configured to exchange data with an external device. The electronic device may include at least one processor 220; 720 configured to control the electronic device. The at least one processor may be configured to perform operation 810 of receiving, from a wearable device 120; 300 connected to the electronic device, log information with respect to a motion of the wearable device. The at least one processor may be configured to perform operation 820 of determining a value of at least one of one or more mobile parameters to be applied to a robot parameter algorithm for calculating a value of a robot parameter used to control the wearable device based on the log information. The processor at least one may be configured to perform operation 830 of determining the value of the robot parameter based on the robot parameter algorithm and the determined value of at least one of the mobile parameters. The at least one processor may be configured to perform operation 840 of transmitting the determined value of the robot parameter to the wearable device.

According to an example embodiment, at least one of a magnitude of a torque output from the wearable device, a direction of the torque, or a timing of the torque may be controlled based on the value of the robot parameter.

According to an example embodiment, the robot parameter may be a parameter for adjusting at least one of a magnitude of a torque output from the wearable device, a direction of the torque, a timing of the torque, an offset angle between joint angles, and a sensitivity of a state factor with respect to the joint angles.

According to an example embodiment, the log information may include at least one of joint angle information, joint angular velocity information, inertial measurement unit (IMU) information, or global positioning system (GPS) information of the wearable device.

According to an example embodiment, operation 820 of determining the value of at least one of the mobile parameters may include operation 910 of generating a user feature of a user wearing the wearable device based on the log information. Operation 820 of determining the value of at least one of the mobile parameters may include operation 920 of determining the value of at least one of the mobile parameters based on the user feature.

According to an example embodiment, operation 910 of generating the user feature of the user wearing the wearable device based on the log information may include generating the user feature by inputting the log information and a reference value of a user feature mobile parameter among the mobile parameters into a user feature algorithm. The reference value of the user feature mobile parameter may be determined based on user information of the user.

According to an example embodiment, the processor may be further configured to perform receiving the user information through a user interface.

According to an example embodiment, the user feature may include at least one of a gait age, a muscular strength, a gait symmetricity, or a gait rhythm.

According to an example embodiment, operation 820 of determining the value of at least one of the mobile parameters may include operation 1010 of generating workout summary information of a user wearing the wearable device based on the log information. Operation 820 of determining the value of at least one of the mobile parameters may include operation 1020 of determining the value of at least one of the mobile parameters based on the workout summary information.

According to an example embodiment, operation 1010 of generating the workout summary information of the user wearing the wearable device based on the log information may include generating the workout summary information by inputting the log information and a reference value of a workout summary information mobile parameter among the mobile parameters into a workout summary information algorithm. The reference value of the workout summary information mobile parameter may be determined based on user information of the user.

According to an example embodiment, the workout summary information may include at least one of a date of workout, a duration of workout, an average stride width, an average gait speed, or consumed calories.

According to an example embodiment, operation 820 of determining the value of the robot parameter based on the robot parameter algorithm and the determined value of at least one of the mobile parameters may include determining the value of the robot parameter by inputting, into the robot parameter algorithm, a first value of a first mobile parameter among the one or more mobile parameters and at least one of workout summary information or a user feature of a user wearing the wearable device generated using the log information.

According to an example embodiment, the robot parameter algorithm may be determined based on a workout program received from a user wearing the wearable device.

According to an example embodiment, the processor may be further configured to perform operation 1110 of receiving login information from a user through a user interface. The processor may be further configured to perform operation 1120 of receiving a user data set with respect to the user from a server based on the login information, the processor may be further configured to perform operation 1130 of transmitting a reference value of the robot parameter to the wearable device based on the user data set. A torque may be output to the user wearing the wearable device based on the reference value of the robot parameter, and the log information may be generated based on the torque.

According to an example embodiment, operation 820 of determining the value of at least one of the one or more mobile parameters may include operation 1210 of generating, when the log information is test log information with respect to a test motion, a first simulation result based on the test log information and an initial value of a first mobile parameter among the one or more mobile parameters. Operation 820 of determining the value of at least one of the one or more mobile parameters may include operation 1220 of calculating a difference between a preset result with respect to the test motion and the first simulation result. Operation 820 of determining the value of at least one of the one or more mobile parameters may include operation 1230 of determining an optimal value of the first mobile parameter based on the difference.

According to an example embodiment, the electronic device may be a server 140; 700. The server may be configured to receive the log information through a user terminal 110; 201 connected, directly or indirectly, to the wearable device. The server may be configured to transmit the value of the robot parameter to the wearable device through the user terminal.

According to an example embodiment, a method performed by an electronic device 110; 140; 201; 700 may include operation 810 of receiving, from a wearable device 120; 300 connected, directly or indirectly, to the electronic device, log information with respect to a motion of the wearable device. The method may include operation 820 of determining a value of at least one of one or more mobile parameters to be applied to a robot parameter algorithm for calculating a value of a robot parameter used to control the wearable device based on the log information. The method may include operation 830 of determining the value of the robot parameter based on the robot parameter algorithm and the determined value of at least one of the mobile parameters. The processor may be configured to perform operation 840 of transmitting the determined value of the robot parameter to the wearable device.

According to an example embodiment, at least one of a magnitude of a torque output from the wearable device, a direction of the torque, or a timing of the torque may be controlled based on the value of the robot parameter.

According to an example embodiment, operation 820 of determining the value of the robot parameter based on the determined value of at least one of the mobile parameters may include determining the value of the robot parameter by inputting, into the robot parameter algorithm, a first value of a first mobile parameter among the one or more mobile parameters and at least one of workout summary information or a user feature of a user wearing the wearable device generated using the log information.

According to an example embodiment, a server 140; 700 may include a communication module 710 configured to exchange data with an external device. The server may include at least one processor 720 configured to control the server. The processor may be configured to perform operation 810 of receiving log information with respect to a motion of a wearable device 120; 300 through a user terminal 110; 201 connected to the wearable device. The processor may be configured to perform operation 820 of determining a value of at least one of one or more mobile parameters to be applied to a robot parameter algorithm for calculating a value of a robot parameter used to control the wearable device based on the log information. The processor may be configured to perform operation 830 of determining the value of the robot parameter based on the robot parameter algorithm and the determined value of at least one of the mobile parameters. The processor may be configured to perform operation 840 of transmitting the determined value of the robot parameter to the wearable device through the user terminal. "Based on" as used herein covers based at least on.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa. The term "software module" as used herein may include various processing circuitry and/or executable program instructions. The same applies to "software modules."

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a communication module, comprising communication circuitry;
at least one processor including processing circuitry; and
memory storing instructions, that, when executed by the at least one processor individually or collectively, cause the electronic device to:
receive, via the communication module, from a wearable device connected to the electronic device, log information regarding a motion of the wearable device;
determine a value of at least one of one or more mobile parameters to be applied to a robot parameter algorithm for calculating a value of a robot parameter to be used to control the wearable device based on the log information;
determine the value of the robot parameter based on the robot parameter algorithm and the determined value of at least one of the mobile parameters; and
control to transmit, via the communication module, the determined value of the robot parameter to the wearable device,
wherein the instructions, when executed by the at least one processor individually or collectively, cause the electronic device to:
determine the value of at least one of the mobile parameters at least by:
generating workout summary information of a user wearing the wearable device based on the log information; and
determining the value of at least one of the mobile parameters based on the workout summary information, and
wherein the robot parameter is a parameter for adjusting at least one of an offset angle between joint angles, or a sensitivity of a state factor with respect to the joint angles and at least one of a magnitude of a torque output from the wearable device, a direction of the torque, or a timing of the torque.

2. The electronic device of claim 1, wherein
at least one of a magnitude of a torque output from the wearable device, a direction of the torque, or a timing of the torque is controlled based on the value of the robot parameter.

3. The electronic device of claim 1, wherein
the log information comprises at least one of joint angle information, joint angular velocity information, inertial measurement unit (IMU) information, or global positioning system (GPS) information of the wearable device.

4. The electronic device of claim 1, wherein the instructions, when executed by the at least one processor individually or collectively, cause the electronic device to:
determine the value of at least one of the mobile parameters, at least by
generating a user feature of a user wearing the wearable device based on the log information; and
determining the value of at least one of the mobile parameters based on the user feature.

5. The electronic device of claim 4, wherein the generating of the user feature of the user wearing the wearable device based on the log information comprises generating the user feature by inputting the log information and a reference value of a user feature mobile parameter among the mobile parameters into a user feature algorithm, wherein the reference value of the user feature mobile parameter is determined based on user information of the user.

6. The electronic device of claim 5, wherein the instructions, when executed by the at least one processor individually or collectively, cause the electronic device to receive the user information through a user interface.

7. The electronic device of claim 4, wherein the user feature comprises at least one of a gait age, a muscular strength, a gait symmetricity, or a gait rhythm.

8. The electronic device of claim 1, wherein the generating of the workout summary information of the user wearing the wearable device based on the log information comprises generating the workout summary information by inputting the log information and a reference value of a workout summary information mobile parameter among the mobile parameters into a workout summary information algorithm, wherein the reference value of the workout summary information mobile parameter is determined based on user information of the user.

9. The electronic device of claim 1, wherein the workout summary information comprises at least one of a date of workout, a duration of workout, an average stride width, an average gait speed, or consumed calories.

10. The electronic device of claim 1, wherein the determining of the value of the robot parameter based on the robot parameter algorithm and the determined value of at least one of the mobile parameters comprises determining the value of the robot parameter by inputting, into the robot parameter algorithm, a first value of a first mobile parameter among the one or more mobile parameters and at least one of workout summary information or a user feature of a user wearing the wearable device generated using the log information.

11. The electronic device of claim 1, wherein the robot parameter algorithm is determined based on a workout program received from the user wearing the wearable device.

12. The electronic device of claim 1, wherein the instructions, when executed by the at least one processor individually or collectively, cause the electronic device to:

receive login information from a user through a user interface;

receive a user data set with respect to the user from a server based on the login information; and transmit a reference value of the robot parameter to the wearable device based on the user data set, wherein a torque is output to the user wearing the wearable device based on the reference value of the robot parameter, and the log information is generated based on the torque.

13. The electronic device of claim 1, wherein the electronic device comprises a server, and wherein the server is configured to:

receive the log information through a user terminal connected to the wearable device, and transmit, via the communication module, the value of the robot parameter to the wearable device through the user terminal.

14. An electronic device, comprising:

a communication module, comprising communication circuitry;

at least one processor including processing circuitry; and memory storing instructions that, when executed by the at least one processor individually or collectively, cause the electronic device to:

receive, via the communication module from a wearable device connected to the electronic device, log information regarding a motion of the wearable device;

determine a value of at least one of one or more mobile parameters to be applied to a robot parameter algorithm for calculating a value of a robot parameter to be used to control the wearable device based on the log information;

determine the value of the robot parameter based on the robot parameter algorithm and the determined value of at least one of the mobile parameters; and control to transmit, via the communication module, the determined value of the robot parameter to the wearable device, wherein the determining of the value of at least one of the one or more mobile parameters comprises:

generating, when the log information is test log information with respect to a test motion, a first simulation result based on the test log information and an initial value of a first mobile parameter among the one or more mobile parameters;

calculating a difference between a preset result with respect to the test motion and the first simulation result; and determining an optimal value of the first mobile parameter based on the difference.

15. A method performed by an electronic device, the method comprising:

receiving, from a wearable device connected to the electronic device, log information regarding a motion of the wearable device;

determining a value of at least one of one or more mobile parameters to be applied to a robot parameter algorithm for calculating a value of a robot parameter to be used to control the wearable device based on the log information;

determining the value of the robot parameter based on the robot parameter algorithm and the determined value of at least one of the mobile parameters; and transmitting, via the communication module, the determined value of the robot parameter to the wearable device, wherein the determining the value of at least one of the one or more mobile parameters comprises:

generating workout summary information of a user wearing the wearable device based on the log information; and determining the value of at least one of the mobile parameters based on the workout summary information, and wherein the robot parameter is a parameter for adjusting at least one of an offset angle between joint angles, or a sensitivity of a state factor with respect to the joint angles and at least one of a magnitude of a torque output from the wearable device, a direction of the torque, or a timing of the torque.

16. The method of claim 15, wherein at least one of a magnitude of a torque output from the wearable device, a direction of the torque, or a timing of the torque is controlled based on the value of the robot parameter.

17. The method of claim 15, wherein the determining of the value of the robot parameter based on the determined value of at least one of the mobile parameters comprises determining the value of the robot parameter by inputting, into the robot parameter algorithm, a first value of a first mobile parameter among the one or more mobile parameters and at least one of workout summary information or a user feature of the user wearing the wearable device generated using the log information.

\* \* \* \* \*